United States Patent
Sakakima

(10) Patent No.: US 9,715,862 B2
(45) Date of Patent: Jul. 25, 2017

(54) IMAGE PROCESSING APPARATUS AND CONTROL METHOD THEREOF

(71) Applicant: CANON KABUSHIKI KAISHA, Tokyo (JP)

(72) Inventor: Eito Sakakima, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 14/665,373

(22) Filed: Mar. 23, 2015

(65) Prior Publication Data
US 2015/0279317 A1    Oct. 1, 2015

(30) Foreign Application Priority Data

Mar. 28, 2014 (JP) .................. 2014-068904

(51) Int. Cl.
G09G 5/02 (2006.01)
H04N 1/00 (2006.01)

(52) U.S. Cl.
CPC .......... *G09G 5/02* (2013.01); *H04N 1/00129* (2013.01); *H04N 1/00204* (2013.01); *G09G 2320/0613* (2013.01); *G09G 2320/0666* (2013.01); *G09G 2320/0693* (2013.01); *G09G 2340/06* (2013.01); *G09G 2360/144* (2013.01)

(58) Field of Classification Search
CPC ..... G09G 5/02; G09G 2320/0613; H04N 1/60
See application file for complete search history.

(56) References Cited

U.S. PATENT DOCUMENTS 9,105,217 B2 * 8/2015 Demos ............... G01J 3/02
2009/0303507 A1 * 12/2009 Abeloe ............. B29C 67/0088
                                                                358/1.9

FOREIGN PATENT DOCUMENTS

JP          2009-139617 A    6/2009

* cited by examiner

*Primary Examiner* — Antonio A Caschera
(74) *Attorney, Agent, or Firm* — Cowan, Liebowitz & Latman, P.C.

(57) ABSTRACT

Image processing apparatus which acquires: a first field of view of an user with respect to a first region in an image on a display; a second field of view of the user with respect to a second region that corresponds to the first region on printed matter on which the image is printed; first information on spectral characteristics of the display; and second information on spectral characteristics of reflected light from the printed matter; and converts image data to be displayed on the display based on the first field of view, the first information, the second field of view, and the second information so that a color perceived by the user in the first field of view on the display becomes a color that corresponds to a color perceived by the user in the second field of view on the printed matter.

20 Claims, 18 Drawing Sheets

| RGB (PRINTED MATTER) (Rp, Gp, Bp) | XYZ (PRINTED MATTER) (Xp, Yp, Zp) |
|---|---|
| 0, 0, 0 | 0.23, 0.23, 0.43 |
| 1, 0, 0 | 0.25, 0.23, 0.43 |
| 2, 0, 0 | 0.28, 0.24, 0.43 |
| 3, 0, 0 | 0.29, 0.23, 0.44 |
| ... | ... |
| 255, 255, 255 | 120, 121, 100 |

CORRESPONDENCE RELATIONSHIP BETWEEN RGB VALUE OF PRINTED MATTER AND XYZ VALUE OF PRINTED MATTER

*Fig.7A*

| RGB (IMAGE DISPLAYING APPARATUS) (Rm, Gm, Bm) | XYZ (IMAGE DISPLAYING APPARATUS) (Xm, Ym, Zm) |
|---|---|
| 0, 0, 0 | 0.21, 0.20, 0.40 |
| 1, 0, 0 | 0.23, 0.21, 0.40 |
| 2, 0, 0 | 0.27, 0.22, 0.43 |
| 3, 0, 0 | 0.28, 0.22, 0.43 |
| ... | ... |
| 255, 255, 255 | 103, 115, 97 |

CORRESPONDENCE RELATIONSHIP BETWEEN RGB VALUE OF IMAGE DISPLAYING APPARATUS AND XYZ VALUE OF IMAGE DISPLAYING APPARATUS

*Fig.7C*

| RGB (PRINTED MATTER) | XYZ (PRINTED MATTER) |
|---|---|
| 0, 0, 0 | 0.23, 0.23, 0.43 |
| 1, 0, 0 | 0.25, 0.23, 0.43 |
| 2, 0, 0 | 0.28, 0.24, 0.43 |
| 3, 0, 0 | 0.29, 0.23, 0.44 |
| ... | ... |
| 255, 255, 255 | 120, 121, 100 |

*Fig.7B*

| RGB (IMAGE DISPLAYING APPARATUS) | XYZ (PRINTED MATTER) |
|---|---|
| 0.5, 0.3, 0.0 | 0.23, 0.23, 0.43 |
| 2.1, 1.5, 0.3 | 0.25, 0.23, 0.43 |
| 2.4, 2.0, 0.8 | 0.28, 0.24, 0.43 |
| 3.5, 2.8, 1.5 | 0.29, 0.23, 0.44 |
| ... | ... |
| 254, 255, 253 | 120, 121, 100 |

*Fig.7D*

CALCULATE RGB VALUE OF MONITOR CORRESPONDING TO XYZ VALUE OF PRINTED MATTER

| RGB (PRINTED MATTER) | RGB (IMAGE DISPLAYING APPARATUS) | | XYZ |
|---|---|---|---|
| 0, 0, 0 | 0.5, 0.3, 0.0 | ↔ | 0.23, 0.23, 0.43 |
| 1, 0, 0 | 2.1, 1.5, 0.3 | ↔ | 0.25, 0.23, 0.43 |
| 2, 0, 0 | 2.4, 2.0, 0.8 | ↔ | 0.28, 0.24, 0.43 |
| 3, 0, 0 | 3.5, 2.8, 1.5 | ↔ | 0.29, 0.23, 0.44 |
| ... | ... | | ... |
| 255, 255, 255 | 254, 255, 253 | ↔ | 120, 121, 100 |

CONVERSION TABLE FROM RGB VALUE OF PRINTED MATTER TO RGB VALUE OF IMAGE DISPLAYING APPARATUS IS CREATED

*Fig.7E*

BOTH RGB VALUES OUTPUT SAME XYZ VALUE

*Fig.7F*

IMAGE PROCESSING APPARATUS AND CONTROL METHOD THEREOF

BACKGROUND OF THE INVENTION

Field of the Invention

The present invention relates to an image processing apparatus and a control method thereof.

Description of the Related Art

A color sensed by a person (visual color or perceived color) can be obtained by spectral characteristics of an observation object and a color matching function. Since color matching functions vary according to fields of view, even when spectral characteristics of an observation object are the same, a color may not be perceived as a same color from a different field of view. A field of view refers to an apparent size of an observation object when the observation object is viewed from a point of view of an user and is expressed by an angle into which the observation object fits as viewed from the user such as a 2 degree field of view and a 10 degree field of view. A field of view is determined by an actual size of an observation object and a distance between the observation object and an user (visual distance).

Japanese Patent Application Laid-open No. 2009-139617 discloses a technique for converting a color of an image to be displayed on a display so that a perceived color when observing the image in a given field of view is equal to a perceived color when observing the image in a different field of view. According to the technique, a perceived color of an image displayed on a display can be kept the same regardless of the field of view.

There is a technique for reproducing colors of printed matter that is printed by a printer to be reproduced on a display. This technique is referred to as emulated display. High precision emulated display enables soft proofing in which a finish of printing can be checked on a display without having to actually perform printing. In emulated display, in order to accurately display a color of printed matter on a display, the color of the printed matter is measured and a display color is adjusted so that a measured value of the color equals the display color on the display. This adjustment involves measuring a color of the printed matter in a specific field of view and adjusting a color on the display in the same field of view so as to equal the color of the printed matter.

SUMMARY OF THE INVENTION

A degree of change that occurs in a perceived color due to a difference in fields of view varies depending on spectral characteristics of an observation object. For example, with an observation object with broad spectral characteristics such as sunlight or a fluorescent lamp, a degree of change that occurs in a perceived color due to a difference in fields of view is small. However, with an observation object with spectral characteristics that include a sudden peak in a specific wavelength such as a light emitting diode (LED), a degree of change that occurs in a perceived color due to a difference in fields of view is large.

In particular, with an image displaying apparatus provided with a backlight having LEDs of respective RGB colors that enable wide color gamut display as a light source, a difference in perceived colors according to fields of view is likely to arise and may degrade image quality with respect to an user. Spectral characteristics of printed matter (spectral characteristics of reflected light created by printed matter from illuminating light) and spectral characteristics of a display may also significantly differ from one another. In such a case, even if an adjustment is made so that a perceived color of the printed matter becomes equal to a perceived color of the display in a certain field of view, a perceived color of the printed matter may not necessarily equal a perceived color of the display in a different field of view.

In consideration thereof, the present invention provides an image processing apparatus capable of matching a perceived color of printed matter and a perceived color of a display to each other even if fields of view change.

A first aspect of the present invention is an image processing apparatus including:
  an acquiring unit configured to:
    acquire a first field of view that is a field of view of an user with respect to a first region in an image based on image data, on a display that displays the image,
    acquire a second field of view of the user with respect to a second region that corresponds to the first region on printed matter on which the image based on the image data is printed,
    acquire information regarding spectral characteristics of the display, and
    acquire information regarding spectral characteristics of reflected light from the printed matter; and
  a converting unit configured to convert image data to be displayed on the display based on the first field of view, the information regarding spectral characteristics of the display, the second field of view, and the information regarding spectral characteristics of reflected light from the printed matter so that a color perceived by the user in the first field of view on the display becomes a color that corresponds to a color perceived by the user in the second field of view on the printed matter.

A second aspect of the present invention is a control method of an image processing apparatus, including the steps of:
  acquiring a first field of view that is a field of view of an user with respect to a first region in an image based on image data, on a display that displays the image;
  acquiring a second field of view of the user with respect to a second region that corresponds to the first region on printed matter on which the image based on the image data is printed;
  acquiring information regarding spectral characteristics of the display;
  acquiring information regarding spectral characteristics of reflected light from the printed matter; and
  converting image data to be displayed on the display based on the first field of view, the information regarding spectral characteristics of the display, the second field of view, and the information regarding spectral characteristics of reflected light from the printed matter so that a color perceived by the user in the first field of view on the display becomes a color that corresponds to a color perceived by the user in the second field of view on the printed matter.

According to the present invention, an image processing apparatus can be provided which is capable of matching a perceived color of printed matter and a perceived color of a display to each other even if fields of view change.

Further features of the present invention will become apparent from the following description of exemplary embodiments with reference to the attached drawings.

BRIEF DESCRIPTION OF THE DRAWINGS

FIGS. 7A to 7F are diagrams explaining a method of obtaining a color conversion table according to the first embodiment;

DESCRIPTION OF THE EMBODIMENTS

Hereinafter, embodiments of the present invention will be described with reference to the drawings. The respective embodiments described below are not intended to limit the present invention to the embodiments. Before describing the embodiments, a brief description will be given on a relationship among spectral characteristics of an observation object, a color matching function, and a perceived color (visual color), a relationship between a field of view and a color matching function, and a phenomenon of a difference between printed matter and a display on a display in degrees of change in a perceived color according to a field of view.

Figure 9:
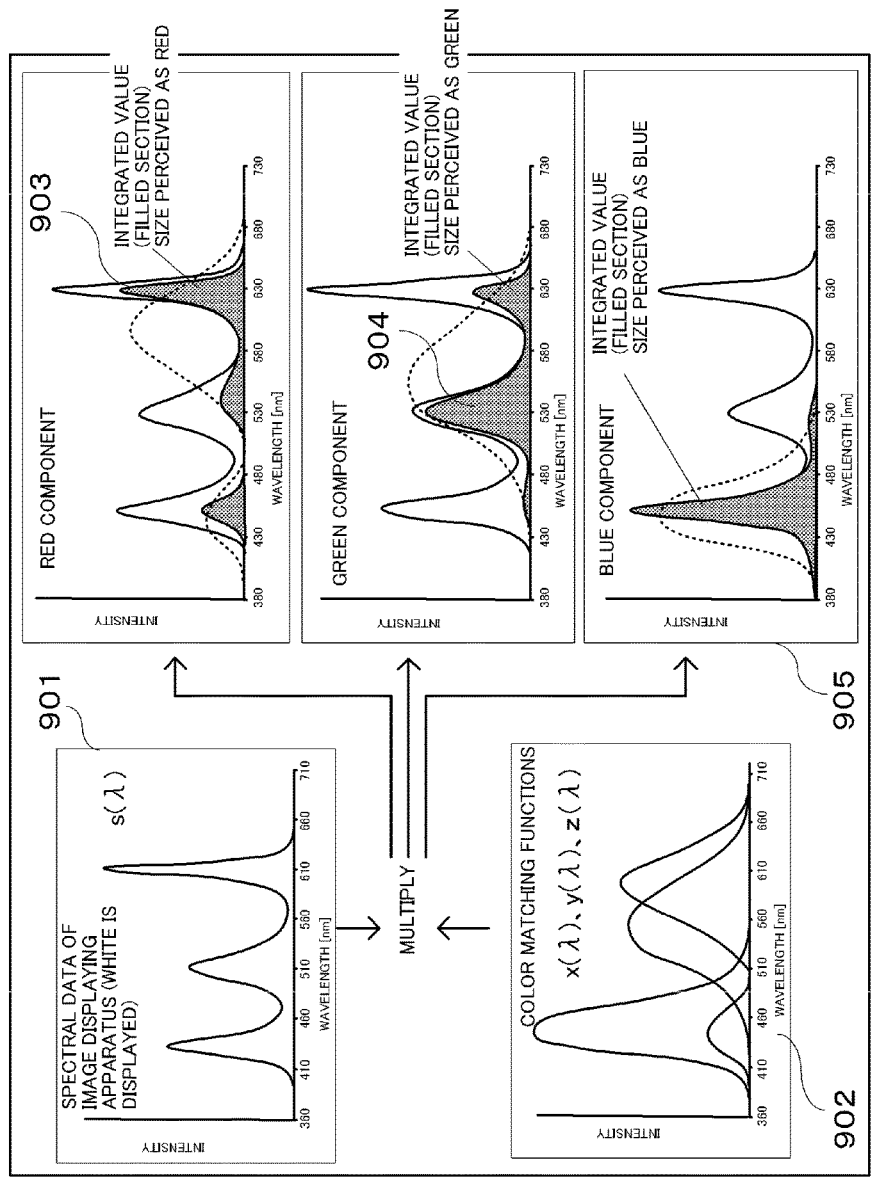
FIG. 9 is a diagram explaining a method of calculating a perceived color based on an observation object and a color matching function.

FIG. 9 is a diagram explaining a method of calculating a perceived color based on spectral characteristics of an observation object and a color matching function. A graph 901 in FIG. 9 shows spectral characteristics of a display when white is displayed on the display. A graph 902 shows respective color matching functions of red, green, and blue. An area of a region 903 in FIG. 9 is calculated as an integral of a product of spectral characteristics and a color matching function of red and represents a stimulus value X of a red component.

In a similar manner, an area of a region 904 represents a stimulus value Y of a green component and an area of a region 905 represents a stimulus value Z of a blue component. As shown, a perceived color (an amount of color perception) can be calculated based on spectral characteristics of an observation object and a color matching function.

Figure 8:
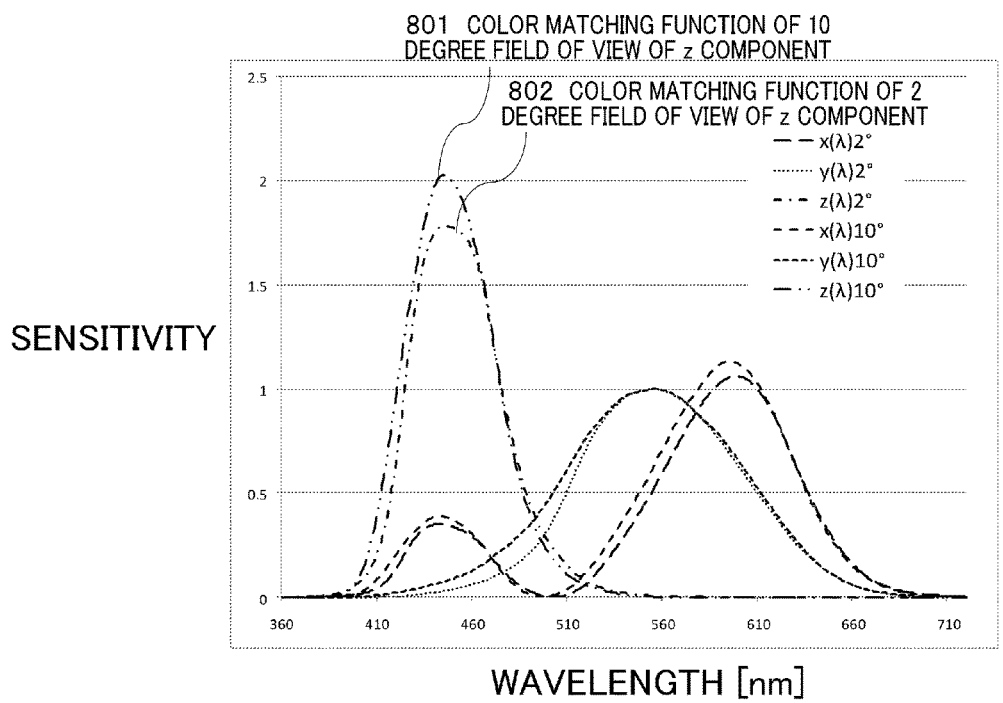
FIG. 8 is a diagram explaining a color matching function for each field of view.

FIG. 8 is a diagram showing differences in color matching functions according to fields of view. FIG. 8 shows two color matching functions: a 2 degree field of view and a 10 degree field of view. In FIG. 8, a horizontal axis represents wavelength and a vertical axis represents the sensitivity of a human eye. As shown in FIG. 8, a color matching function 801 of a 10 degree field of view and a color matching function 802 of a 2 degree field of view differ from one another. Therefore, XYZ stimulus values also differ between a 10 degree field of view and a 2 degree field of view. As shown, since color matching functions differ according to fields of view, even observation objects with the same color may be perceived to be in a different color in a different field of view.

Figure 10:
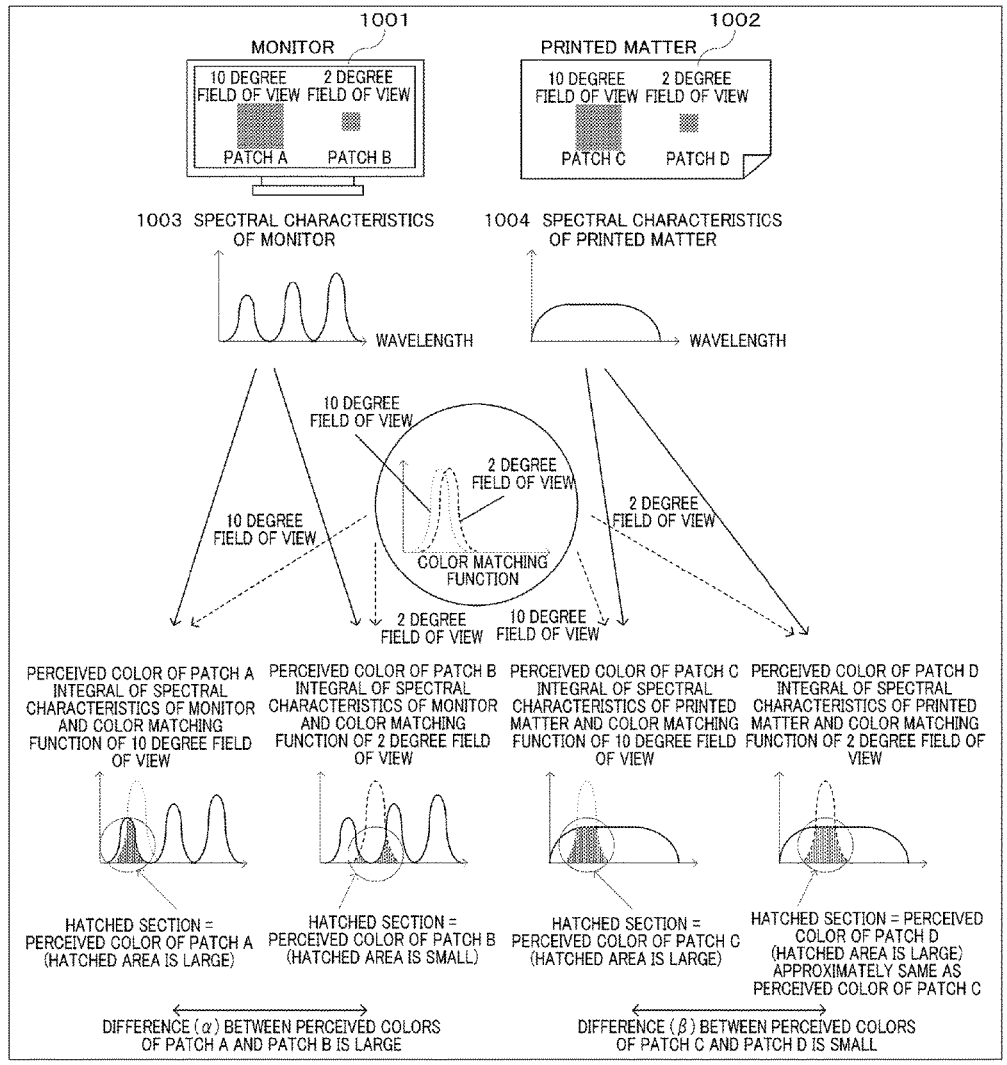
FIG. 10 is a diagram explaining a change in perceived color due to a change in fields of view or a difference in spectral characteristics.

FIG. 10 is a diagram for explaining that manners (degrees) of change in a perceived color according to fields of view vary depending on spectral characteristics of an observation object. FIG. 10 shows that differences in perceived color created between patches of different sizes (between patches with different fields of view) differ between a display and printed matter.

A patch A that is observed in a 10 degree field of view and a patch B that is observed in a 2 degree field of view at a given visual distance are displayed on a display 1001. The patch A and the patch B are patches of the same color. Printed matter 1002 is a printout of patches displayed on the display 1001. A patch C that is observed in a 10 degree field of view and a patch D that is observed in a 2 degree field of view are printed on the printed matter 1002. The patch C and the patch D are patches of the same color.

Spectral characteristics 1003 represent spectral characteristics of a color of the patch A and the patch B displayed on the display 1001. Spectral characteristics 1004 represent spectral characteristics of the patch C and the patch D of the printed matter 1002 under a given light source. While the spectral characteristics of the display 1001 is a steep spectrum having a peak in a specific wavelength, the spectral characteristics of the printed matter 1002 is a spectrum spreading uniformly over a wide wavelength region.

Hatched sections 1005 to 1008 in FIG. 10 represent results of perceived colors of the respective patches of the display 1001 and the printed matter 1002 obtained using color matching functions of a 2 degree field of view and a 10 degree field of view corresponding to sizes of the respective patches and spectral characteristics of the display 1001 and the printed matter 1002. Note that FIG. 10 only shows color matching functions of Z components for the sake of brevity.

The hatched section 1005 represents a perceived color of the patch A and the hatched section 1006 represents a perceived color of the patch B. Since the spectral characteristics 1003 of the display have a narrow shape, a significant difference has occurred between an area of the hatched section 1005 and an area of the hatched section 1006 due to differences in color matching functions. In other words, on the display, perceived colors differ significantly between the patch A and the patch B.

On the other hand, the hatched section 1007 represents a perceived color of the patch C and the hatched section 1008 represents a perceived color of the patch D. Since the spectral characteristics 1004 of the printed matter have a broad spectrum shape, a significant difference does not occur between an area of the hatched section 1007 and an area of the hatched section 1008 even if color matching functions change. Therefore, perceived colors do not differ significantly between the patch C and the patch D.

As shown, a degree of variation in a perceived color due to changes in fields of view differs between a display and printed matter. Therefore, for example, even if an adjustment is made so that the display and the printed matter provide a same perceived color in a 10 degree field of view (the patches A and C), the display and the printed matter may not provide a same perceived color in a 2 degree field of view (the patches B and D).

The embodiments described below present a method of converting image data so that a color perceived by an user in a first field of view on a display becomes a color corresponding to a color perceived by the user in a second field of view on printed matter. In particular, a method of matching perceived colors between a display and printed matter regardless of fields of view will be described. It is assumed that a match refers to a state where a difference between perceived colors is within a prescribed range.

(First Embodiment)

The first embodiment of the present invention will be described. In the first embodiment, a perceived color of a target region in an image displayed on a display and a perceived color of a target region in a printed image are calculated using color matching functions corresponding to spectral characteristics of the display, spectral characteristics of reflected light from printed matter, and fields of view of the regions of interest. A color (pixel value) of the image displayed on the display is adjusted so that a perceived color when a user observes the target region being displayed on the display becomes equal to a perceived color when the user observes the target region on the printed matter.

Figure 3:
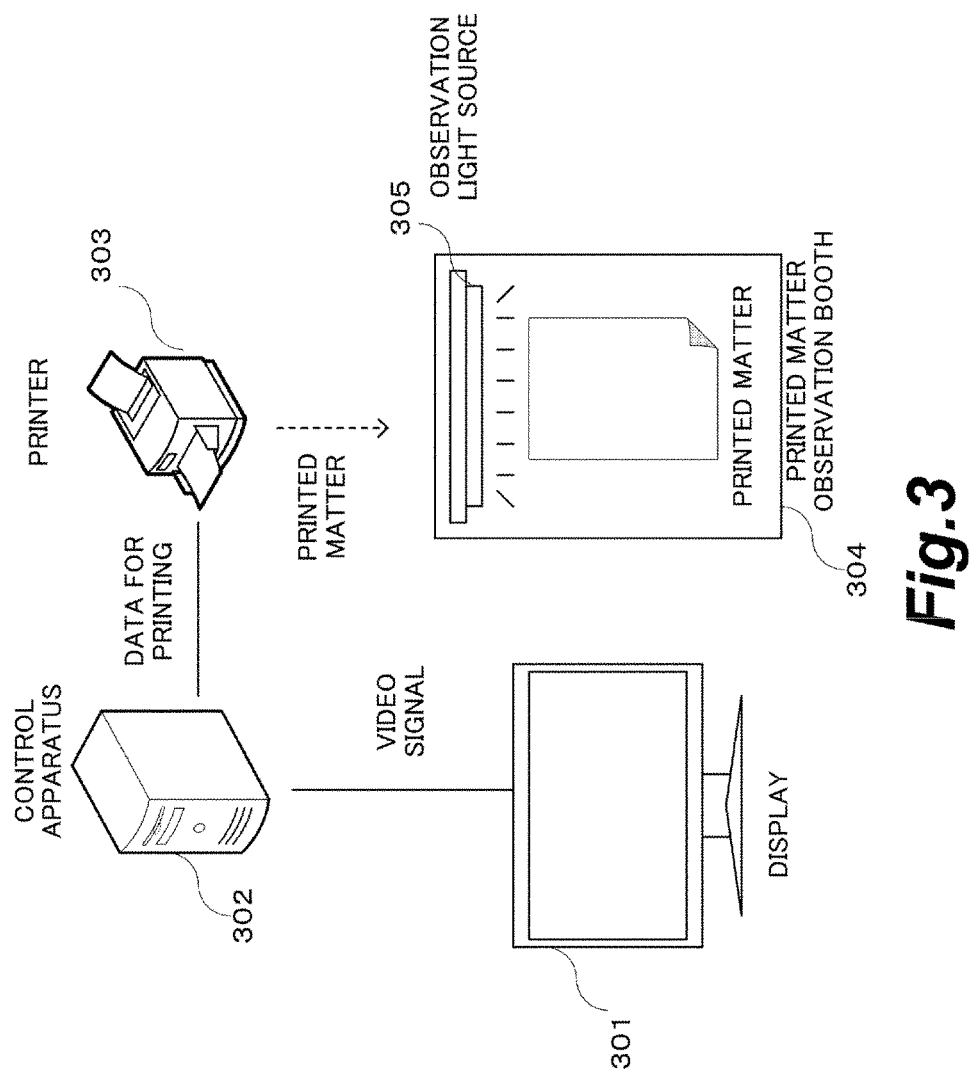
FIG. 3 is a diagram showing a connection state of an image displaying apparatus with peripheral apparatuses.

A schematic configuration of an image processing apparatus according to the first embodiment will now be described with reference to FIG. 3. FIG. 3 is a diagram showing a connection state of the image processing apparatus according to the first embodiment and peripheral apparatuses.

A display 301 displays an image based on image data.

An image processing apparatus 302 outputs image data to the display 301, controls image display, and outputs image data for printing to a printer 303 (to be described later). The image processing apparatus 302 is constituted by, for example, a personal computer (PC).

The printer 303 prints an image based on image data. In the first embodiment, a process for reproducing, on the display 301, a color of an image printed by the printer 303 is performed by the image processing apparatus 302.

A printed matter observation booth 304 is an environment for setting printed matter having been printed by the printer 303 and observing the printed matter using a determined light source. When observing printed matter, visual color fluctuates unless observations are always conducted in a same observation environment. Therefore, when a color must be subjected to strict observation, the printed matter is observed in an environment such as the printed matter observation booth 304 in which a light source and the like are managed.

An observation light source 305 is a light source which is installed inside the printed matter observation booth 304 and which is used to observe printed matter. As the observation light source 305, a light source capable of emitting stable light is used in order to ensure that color of the printed matter is always observed in a stable manner. Specifically, a fluorescent lamp with high color rendering properties is used. In addition, D50 (5000 Kelvin) is used as a color temperature of the observation light source 305.

Figure 2:
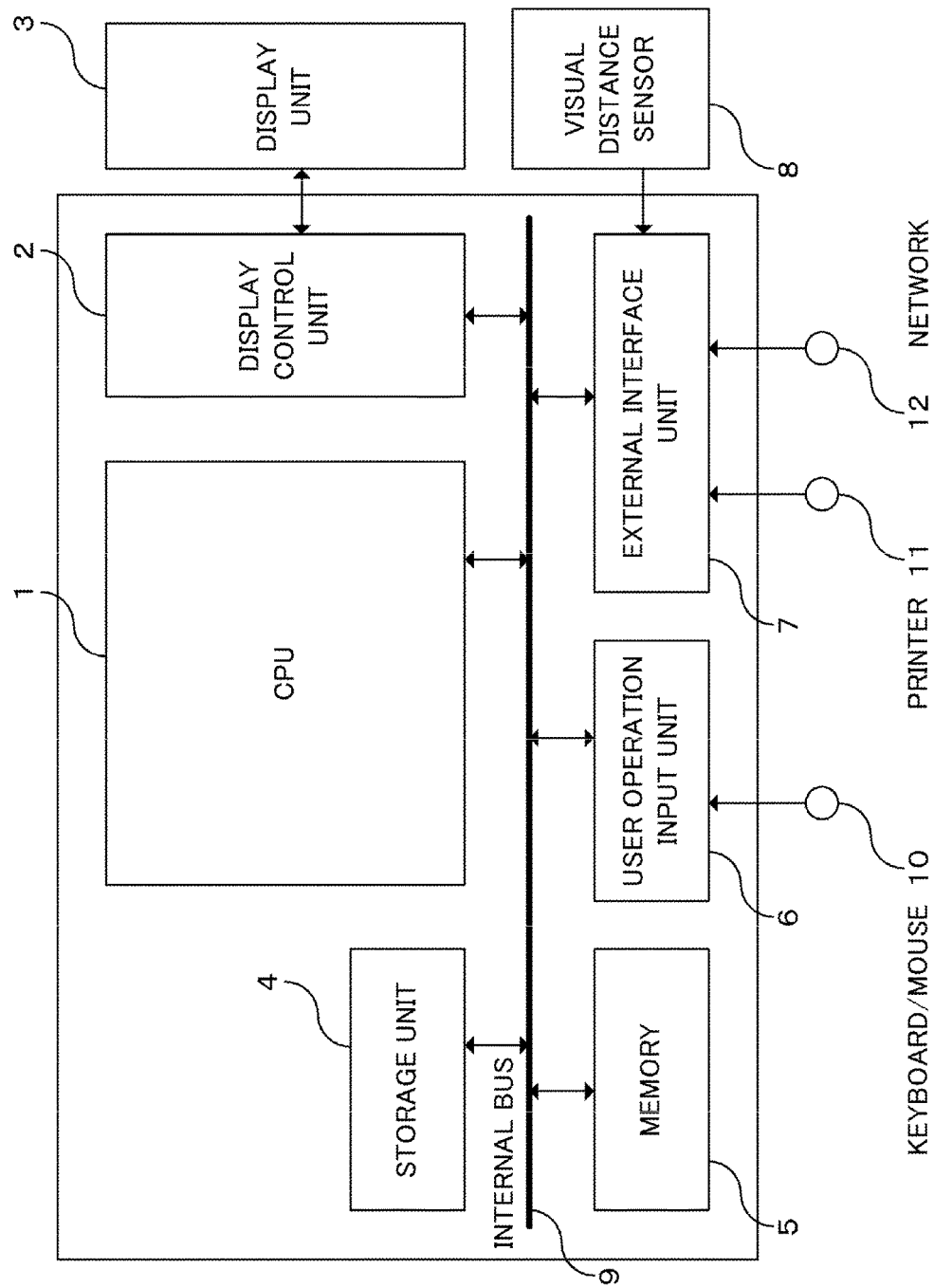
FIG. 2 is a diagram showing an image displaying apparatus.

Next, configurations of the display 301 and the image processing apparatus 302 will be described with reference to the block diagram provided in FIG. 2.

A CPU 1 is a central processing unit (CPU) that performs various controls in the image processing apparatus 302. The CPU 1 executes arithmetic processing for image display by an image viewer 107 (to be described later), calculation of a color conversion lookup table, and the like. In addition, the CPU 1 controls various process flows of the image processing apparatus 302.

A display control unit 2 performs control for displaying an image on a display unit 3 (to be described later). Specifically, the display control unit 2 uses the image viewer 107 (to be described later) to read image data developed on a memory 5 (to be described later) and transmits the image data to the display unit 3.

The display unit 3 displays an image based on image data. The display unit 3 is a display constituted by, for example, a liquid crystal panel and a backlight. The display unit 3 is not limited to a liquid crystal display and may alternatively be a micro electro mechanical system (MEMS) shutter-based display using a MEMS shutter. The display unit 3 corresponds to the display 301 shown in FIG. 3.

A storage unit 4 stores image data, measurement values acquired by a visual distance sensor 8 (to be described later), color conversion lookup tables, and the like. The storage unit 4 also stores a program for the image viewer 107 (to be described later) and the like. Specific examples of the storage unit 4 include a hard disk drive (HDD).

The memory 5 temporarily stores image data and various data for color correction. For example, the memory 5 temporarily stores image data to be displayed by the image viewer 107 (to be described later). In addition, the memory 5 temporarily stores an operation input value from the user and an input value from the visual distance sensor 8.

A user operation input unit 6 is an interface unit that accepts various instructions from the user. Specifically, the user operation input unit 6 accepts an operation performed on a keyboard/mouse 10 (to be described later) and transmits instruction information in accordance with the operation to the memory 5 or the CPU 1 of the image processing apparatus 302.

An external interface unit 7 is an interface unit that handles transmission and reception of data between the image processing apparatus 302 and peripheral apparatuses. Specific examples include a universal serial bus (USB), a wired LAN, and a wireless LAN. In the first embodiment, a printer 11 (to be described later) and a network 12 that is an intranet, the Internet, or the like are connected to the image processing apparatus 302 via the external interface unit 7. The image processing apparatus 302 transmits image data to be printed by the printer 11 connected to the network 12 and receives image data to be displayed by the display unit 3 from the network 12 via the external interface unit 7. The image processing apparatus 302 receives a measurement value of a visual distance from the visual distance sensor 8 (to be described later) via the external interface unit 7.

The visual distance sensor 8 is a first sensor which is installed around the display unit 3 and which measures a distance (visual distance) between the user (user) and the display unit 3.

An internal bus 9 connects the respective blocks of the image processing apparatus 302 and is used for transmission and reception of various data among the blocks.

The keyboard/mouse 10 is an input device that accepts operations from the user for inputting various instructions to the image processing apparatus 302. User operation information according to the keyboard/mouse 10 is input to the image processing apparatus 302 via the user operation input unit 6 of the image processing apparatus 302. While a keyboard/mouse is exemplified as an input device for inputting user operations in the first embodiment, this example is not restrictive. For example, a touch panel or the like installed in the display unit 3 may be used instead.

The printer 11 is a printer that prints an image based on image data. While a method of performing accurate emulated display of a color of printed matter on an image displaying apparatus will be described in the first embodiment, the printer 11 is a printer to be an object of emulation. Examples of the printer 11 to be an emulation object include a printer that prints final articles and a direct digital color proofer (DDCP) used in proofing. The printer 11 corresponds to the printer 303 shown in FIG. 3.

The network 12 is connected to the external interface unit 7 of the image processing apparatus 302. The image processing apparatus 302 acquires various data such as image data and information from the network 12 via the external interface unit 7.

Figure 1:
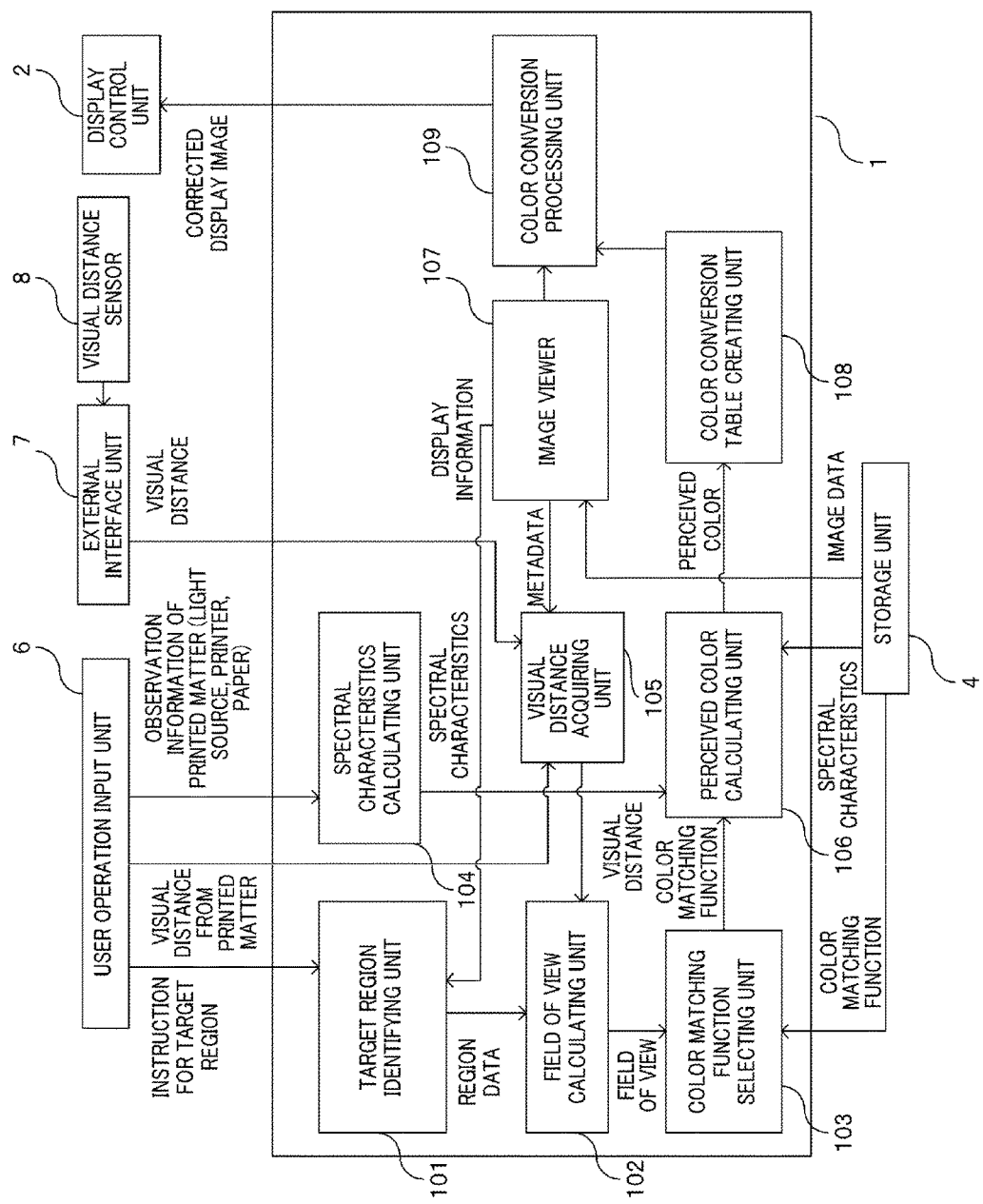
FIG. 1 is a diagram showing functional blocks of an image displaying apparatus.

Next, processes executed in the first embodiment will be described with reference to the functional block diagram shown in FIG. 1. Functions described with reference to FIG. 1 are mainly realized as the CPU 1 shown in FIG. 2 executes programs corresponding to the respective functions. Alternatively, a configuration may be adopted in which hardware corresponding to the respective functions is provided and the hardware and the CPU 1 cooperate with each other to realize the respective functions.

A target region identifying unit 101 receives an instruction from the user and performs a process for identifying a target region in an image. The target region identifying unit 101 identifies a target region that is a region on which the user focuses attention in an image based on an instruction from the user input via the user operation input unit 6 and information on an image displayed on the display.

Specifically, the user specifies a desired region in an image currently being displayed as a target region using a pointing device such as a mouse. The user can input an instruction for specifying a target region by using the pointing device to perform an operation of enclosing a periphery of the target region. In addition, the target region identifying unit 101 acquires information on the image being displayed from the image viewer 107 (to be described later) and identifies a target region and a size thereof based on information on the target region specified by the user. Furthermore, the target region identifying unit 101 acquires information such as a size of the target region on printed matter based on size information upon printing the image as obtained from the image viewer 107.

Figure 4B:
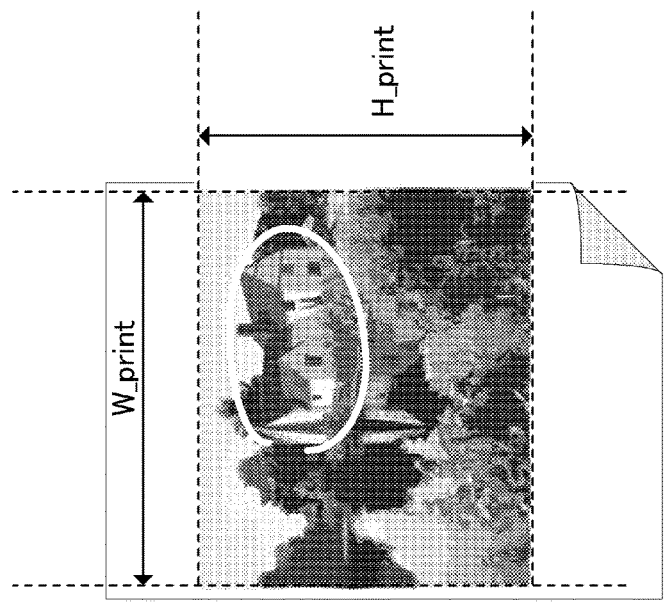
FIGS. 4A and 4B are diagrams explaining a process for having a user identify a target region according to a first embodiment.
Figure 4A:
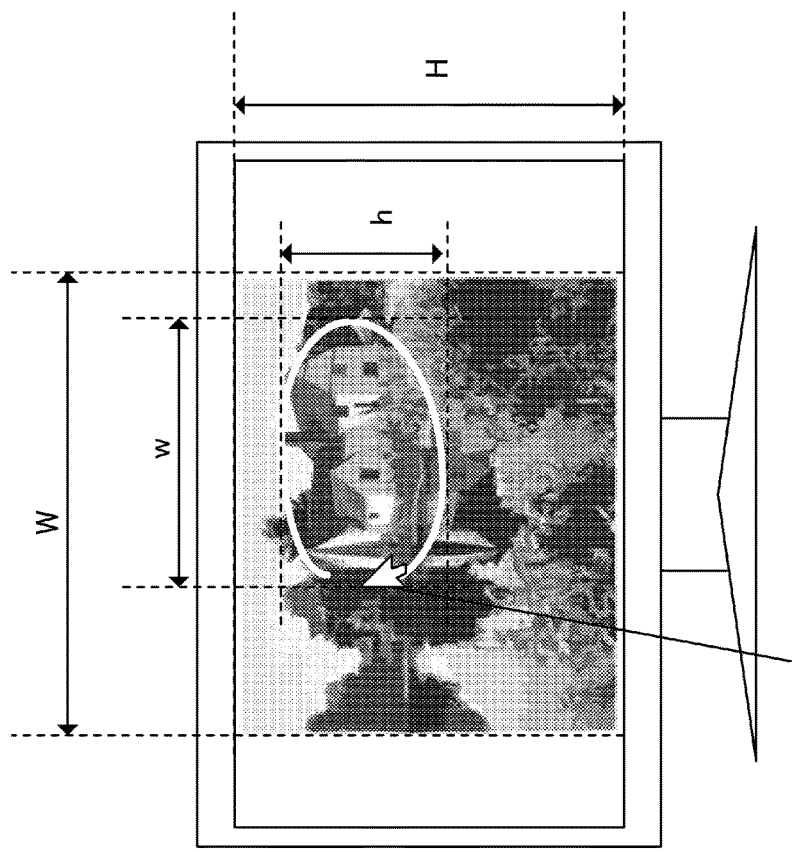

FIG. 4 is a diagram explaining an example of a method used by the user to identify a target region. As shown in FIG. 4A, using a pointing device such as a mouse, the user specifies a desired region as a target region in an image displayed on the display unit 3. For example, when the user performs an operation of enclosing a desired region with a circle or an ellipse, a circumscribing rectangular region of the enclosed region is specified as the target region. The target region identifying unit 101 acquires information on the size of the display unit 3 from the display unit 3 via the display control unit 2. The target region identifying unit 101 calculates a size (a width w and a height h shown in FIG. 4) of the target region specified by the user from the information on the size of the display unit 3. Alternatively, information on a size (a width W and a height H shown in FIG. 4) of the image being displayed may be calculated. In this case, information on the size of the image being displayed refers to information on a physical length on the screen and is calculated based on the number of pixels in the target region, a resolution (number of pixels) and a physical size of the display unit 3, a dot pitch of the display unit 3, and the like.

In addition, the target region identifying unit 101 acquires information on a size of the image being displayed on the display unit 3 and a size of the image when printed from the image viewer 107. Based on the size (a width W_print and a height H_print shown in FIG. 4B) of the printed image, the target region identifying unit 101 calculates a size of the target region when printed. Moreover, when printing an image with a printer and performing proofing using printed matter, it is general practice to check the image by printing the image in a same size as that of a final article. Information on a size of printed matter in the case of printing is added to the image data as metadata. Therefore, information on the size of the printed matter can be acquired by the image viewer 107.

The field of view calculating unit 102 performs a process for obtaining a field of view of a target region in an image observed by the user. The field of view calculating unit 102 calculates and acquires both a field of view (first field of view) of a target region (first region) in an image displayed on the display unit 3 and a field of view (second field of view) of a target region (second region) on printed matter. The field of view calculating unit 102 calculates a field of view using information regarding the target region in the image acquired by the target region identifying unit 101 and information on a visual distance from the user to the observed image. Moreover, in the first embodiment, a field of view is calculated on the assumption that an observation position of the user is a position opposing a center of the display unit 3. The field of view calculating unit 102 acquires information on a visual distance from a visual distance acquiring unit 105 (to be described later). Alternatively, when the center of the display unit 3 is not assumed to be the position of the user, information on a positional relationship between the user and the display unit 3 is acquired by measuring the position of the user or having the user input information on the user's position, whereby a field of view is calculated based on the positional relationship.

Figure 5:
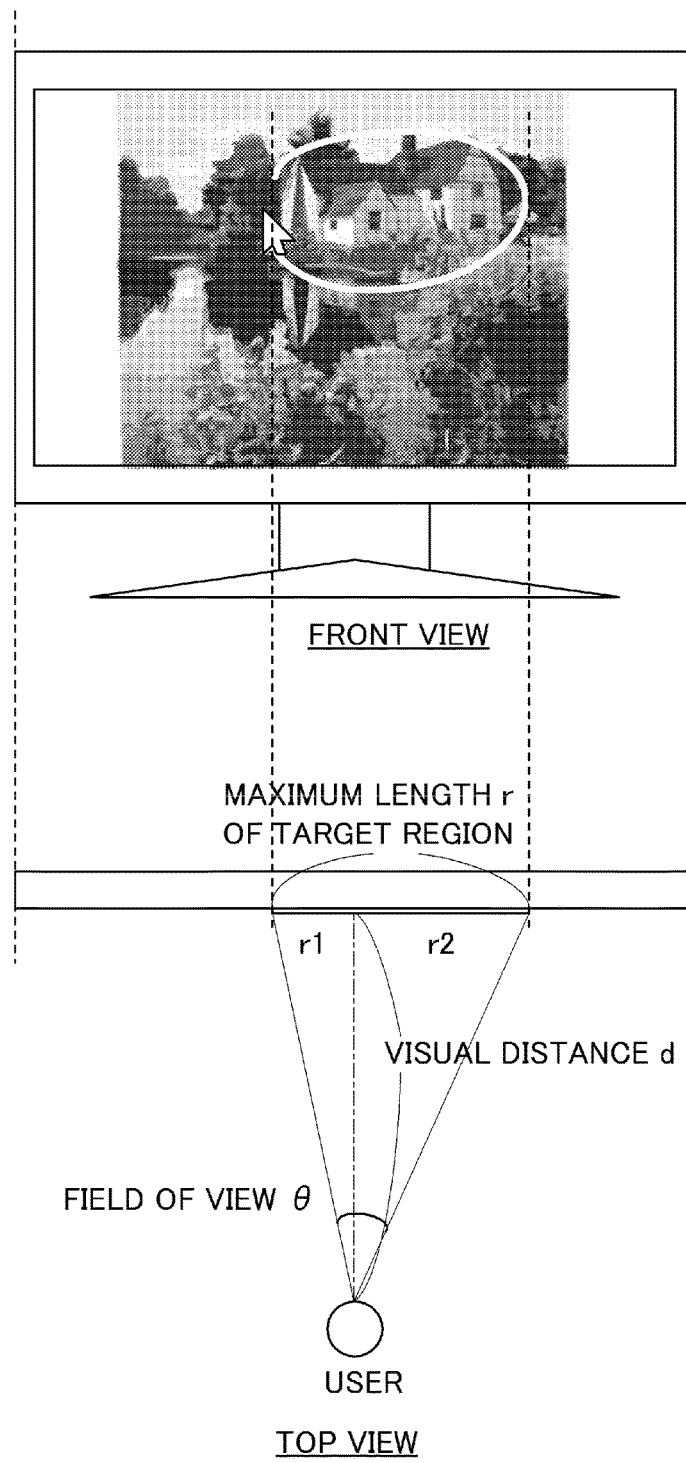
FIG. 5 is a diagram explaining means for identifying a field of view of a target region according to the first embodiment.

FIG. 5 is a diagram explaining a method of calculating a field of view of a target region in an image displayed on the display unit 3. Based on information on a target region acquired by the target region identifying unit 101, the field of view calculating unit 102 acquires a length r of a long side of the target region (a maximum length of the target region) and calculates a field of view based on the length r of the long side. A field of view θ when the observation position of the user is at the center of the display unit 3 is calculated as follows. If a visual distance between the user and the image displaying apparatus is denoted by d, and when the long side of the target region is horizontally bisected at the center position of the display unit 3, if r1 denotes a length on a left side of the center and r2 denotes a length on a right side of the center, then the field of view θ is calculated by the equation below.

$$\theta = \tan^{-1}(r1/d) + \tan^{-1}(r2/d)$$

While a method of calculating a field of view of a target region on the display unit 3 has been described with reference to FIG. 5, a field of view of a target region on printed matter can be calculated in a similar manner.

A color matching function selecting unit 103 performs a process for selecting a color matching function that corresponds to the field of view calculated by the field of view calculating unit 102. Information on color matching functions corresponding to respective fields of view is stored in the storage unit 4. The color matching function selecting unit 103 reads out a color matching function corresponding to the field of view calculated by the field of view calculating unit 102 from the storage unit 4.

The spectral characteristics calculating unit 104 performs a process for calculating spectral characteristics of printed matter. The spectral characteristics of printed matter change according to a printer or paper used and on a light source that illuminates the printed matter in an environment in which the printed matter is to be observed. The spectral characteristics calculating unit 104 acquires information on the printer used, information on the paper used, and information on the light source related to observation of the printed matter and calculates spectral characteristics of the printed matter based on the information.

The visual distance acquiring unit 105 acquires a visual distance between the user and the display unit 3. Conceivable methods in which the visual distance acquiring unit 105 acquires information on a visual distance include a method involving acquiring information on a measurement value of the visual distance from the visual distance sensor 8 and a method involving having the user specify (input) a visual distance. In the first embodiment, the visual distance acquiring unit 105 acquires a visual distance between the display unit 3 and the user from the visual distance sensor 8 and acquires a visual distance between printed matter and the user by having the user specify the visual distance via the user operation input unit 6. The visual distance acquiring unit 105 transmits the acquired visual distance information to the field of view calculating unit 102. The field of view calculating unit 102 calculates a field of view based on the visual distance information acquired from the visual distance acquiring unit 105.

A method of acquiring a visual distance between printed matter and the user will now be briefly described with reference to the drawings. FIG. 6 is a diagram explaining a visual distance between printed matter and the user and a method of acquiring the same.

Figure 6A:
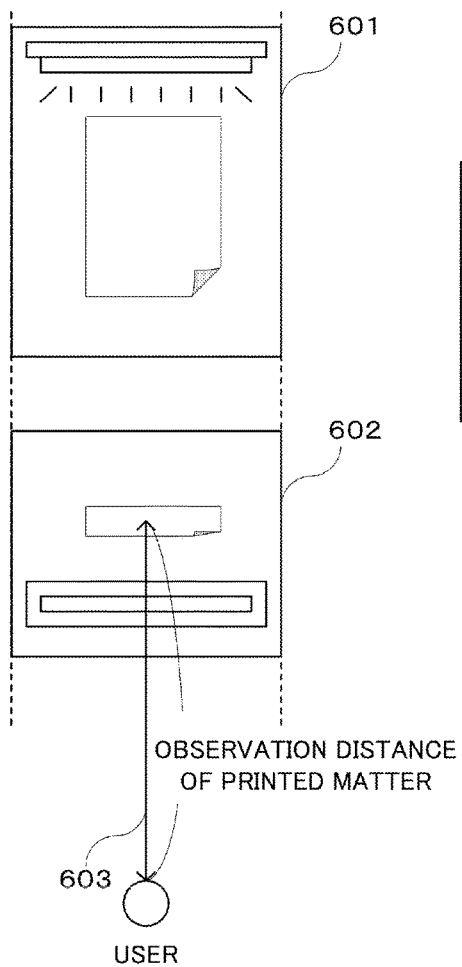
FIGS. 6A and 6B are diagrams showing a method of obtaining a visual distance between printed matter and a user according to the first embodiment.
Figure 6B:
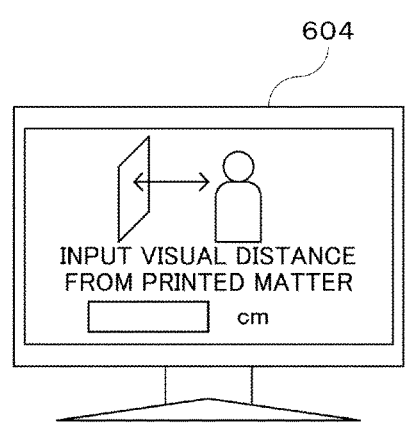

A front view (reference numeral 601) shown in FIG. 6A is a view of the printed matter observation booth 304 from the front. A top view (reference numeral 602) is a view of the printed matter observation booth 304 from above. In the first embodiment, the visual distance acquiring unit 105 acquires information on a visual distance 603 between printed matter and the user when the printed matter is observed in the printed matter observation booth 304 by having the user input information on the visual distance. As the user operates the keyboard/mouse 10, information on the visual distance is input to the image processing apparatus 302 via the user operation input unit 6. At this point, as shown in FIG. 6B, the visual distance acquiring unit 105 may cause the display unit 3 to display a screen 604 of a graphical user interface (GUI) that supports input of a visual distance by the user.

Moreover, while a method of acquiring information on a visual distance between printed matter and the user by having the user input the visual distance has been described, this method is not restrictive. For example, a configuration may be adopted in which a visual distance sensor (second sensor) capable of measuring a visual distance is installed in the printed matter observation booth 304 and a visual distance between printed matter and the user is acquired from the sensor.

A perceived color calculating unit 106 performs a process for calculating a perceived color from a color matching function and spectral characteristics. In the first embodiment, the perceived color calculating unit 106 calculates a perceived color based on an XYZ tristimulus value. The perceived color calculating unit 106 calculates a perceived color of a patch displayed on the display unit 3 and a perceived color of a patch printed on printed matter.

The image viewer 107 outputs image data to be displayed to the display unit 3 via the display control unit 2 and performs a process for causing the display unit 3 to display an image based on the image data. The image viewer 107 acquires the image data to be displayed from the storage unit 4 or from the outside via the external interface unit 7. The image viewer 107 executes an expansion process on the acquired image data and subsequently outputs the image data to the display unit 3 to be displayed. When an instruction for a process related to display such as enlarged or reduced display with respect to an image is input by the user, the image viewer 107 executes a process related to the display. In addition, the image viewer 107 manages information on a region and a size of the image currently being displayed by the display unit 3 and transmits information indicating a display state of the image for identifying a target region to the target region identifying unit 101. Furthermore, the image viewer 107 manages size information of printed matter when printing the image. Generally, in proofing applications, printing is performed in a same size as a final article. Size information of a final article is embedded in the image file as metadata, and the image viewer 107 analyzes the information to acquire size information of printed matter. Since size information of printed matter is information necessary for identifying a target region in the printed matter, the image viewer 107 transmits the size information of the printed matter to the target region identifying unit 101.

A color conversion table creating unit 108 creates a lookup table for converting a color of an image displayed by the display unit 3 so as to equal a color of printed matter. While a lookup table method is used as a method of converting color in the first embodiment, the method is not restrictive and a matrix method or other methods may be adopted instead. A lookup table for color conversion is obtained based on an amount of perception of color displayed on the display unit 3 and an amount of perception of color on printed matter. Hereinafter, a method of creating a lookup table for conversion will be described with reference to the drawings.

FIG. 7 shows a method of obtaining a lookup table that converts a perceived color on a display into a perceived color on printed matter. In this case, a perceived color is an XYZ stimulus value (hereinafter, referred to as an XYZ value) that is obtained by the perceived color calculating unit 106.

A table 701 shown in FIG. 7A is table showing a correspondence relationship between an RGB value of image data input to a printer and an XYZ value of an image printed on printed matter when printing an image based on image data. A table 702 shown in FIG. 7B is table showing a correspondence relationship between an RGB value of image data input to a display and an XYZ value of an image displayed on the display when displaying an image based on image data on the display. As shown in tables 701 and 702, even with image data with a same RGB value, a printed image and an image displayed on a display have different XYZ values.

Using the tables 701 and 702, an RGB value to be input to the display (image data to be displayed on the display) in order to display an XYZ value of the printed matter on the display is obtained. Accordingly, it is obtained that, in order to display an XYZ value of the printed matter shown in FIG. 7B on the display, an RGB value shown in FIG. 7D is to be input to the display. As a result, a lookup table 703 shown in FIG. 7E is obtained. The lookup table 703 shows a correspondence relationship between an RGB value of image data input to the printer and an RGB value to be input to the display in order to display, on the display, an XYZ value of the printed matter that is printed based on the RGB value of image data input to the printer. By converting an RGB value of image data to be input to the printer based on the lookup table 703 and inputting the converted RGB value to the display, a color of the printed matter and a color displayed on the display assume a same XYZ value as shown in FIG. 7F.

A color conversion processing unit 109 performs a process for converting image data to be displayed on the display unit 3 using a lookup table for color conversion created by the color conversion table creating unit 108. The color conversion processing unit 109 performs a color conversion process on image data output by the image viewer 107. The color conversion processing unit 109 outputs image data subjected to color conversion to the display control unit 2, whereby the display unit 3 displays an image based on the image data subjected to color conversion.

Next, a process flow for matching a color of a target region to a color of printed matter according the first embodiment will be described with reference to the drawings. First, with reference to FIG. 11, a process flow in which the user specifies a target region in an image displayed on the display and a color of the specified target region is matched with a color of printed matter will be described.

In step S1101, the CPU 1 determines whether or not information on an observation environment in which printed matter is to be observed is already set (input) to the image processing apparatus 302. In the first embodiment, information regarding a printed matter observation environment includes three pieces of information: (1) information on a light source in the printed matter observation environment, (2) information on a printer and paper to be used for printing, and (3) information on a visual distance to be applied when observing printed matter. These pieces of information are input to the image processing apparatus 302 as a result of being input by the user via the user operation input unit 6 or acquiring a measurement value of a sensor. The input information is stored in the storage unit 4. The determination described above is made based on whether or not the various pieces of information are stored in the storage unit 4. As a result of the determination, when the various pieces of information described above are already input to the image processing apparatus 302, the CPU 1 advances to step S1102, and when the various pieces of information have not been input, the CPU 1 advances to step S1103.

In step S1102, the CPU 1 determines whether or not the observation environment of printed matter has been changed. A change in the observation environment specifically involves a change in the printer used, a change in the paper used, and the like. The determination on whether or not a change has been made is performed based on information input by the user or information acquired from a sensor in a similar manner to step S1101. When it is determined that the observation environment of printed matter has been changed in step S1102, the CPU 1 advances to step S1103, and when observation environment information of printed matter has not been changed, the CPU 1 advances to step S1104.

In step S1103, the CPU 1 sets information regarding the observation environment of the printed matter. As described earlier, observation environment information includes information on a light source of the printed matter observation environment, information on a printer and paper to be used for printing, and information on a visual distance to be applied when observing printed matter. The CPU 1 sets information regarding the observation environment of the printed matter based on information input by the user via the user operation input unit 6 or information acquired from a sensor.

In step S1104, the CPU 1 displays an image using the image viewer 107. The image viewer 107 reads out and displays image data stored in the storage unit 4. In step S1104, the image viewer 107 displays an image on the display in a same size as a size of the image when printed.

In step S1105, the CPU 1 performs a process that involves having the user specify a target region and matching a color of the target region displayed on the display to a color of the printed matter. When the user specifies a target region, a field of view of the target region is calculated by the target region identifying unit 101 and the field of view calculating unit 102. A perceived color of the target region is calculated by the perceived color calculating unit 106 based on the calculated field of view, and a lookup table for color conversion is created by the color conversion table creating unit 108 based on the calculated perceived color. A color conversion process is performed on image data by the color conversion processing unit 109 based on the created lookup table. The image data subjected to the color conversion process is output to and displayed on the display. Details of the process of step S1105 will be provided later.

In step S1106, the CPU 1 determines whether or not to terminate the display of the current image. When a determination to terminate is made, the image display is terminated. The CPU 1 determines to terminate the display of the current image when there is an input of an instruction to display another image or an input of an instruction to terminate the image viewer 107. When a determination not to terminate is made, the CPU 1 advances to step S1105.

Next, details of the respective steps of the process flow described with reference to FIG. 11 will be provided.

Figure 11:
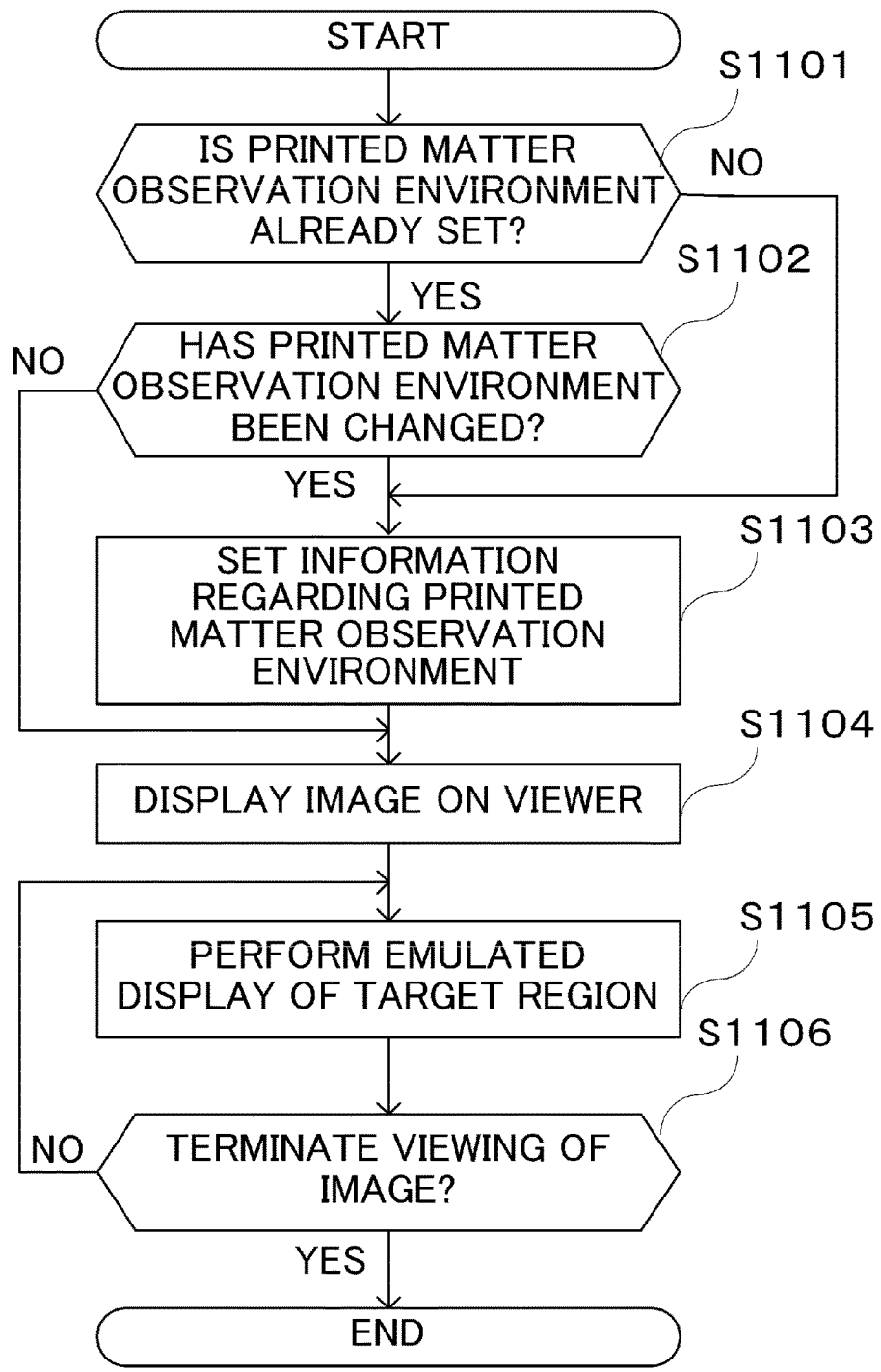
FIG. 11 is a flow chart showing an outline of the first embodiment.
Figure 12:
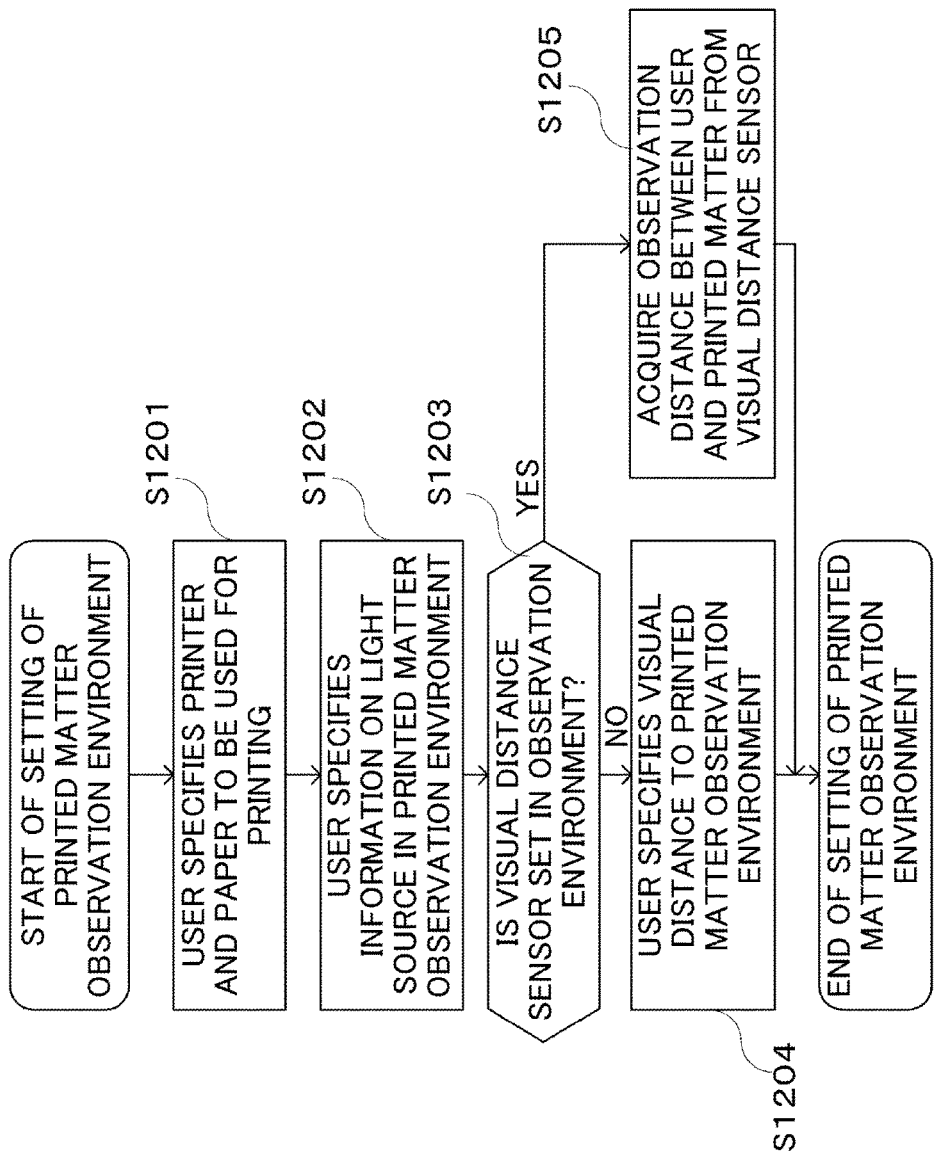
FIG. 12 is a flow chart of a process for setting an observation environment of printed matter according to the first embodiment.

FIG. 12 is a diagram showing a flow of a process for setting an observation environment of printed matter in step S1103 shown in FIG. 11.

In step S1201, the CPU 1 acquires information specified by the user on a printer to print an image and on paper to be used for the printing. In soft proofing, basically, printing is not performed. Actual printing is only performed at several check points along a work flow to check colors. The CPU 1 acquires information on the printer and the paper to be used when performing the printing in step S1201 and converts a color of the display so as to match a color printed using the acquired printer and paper. Accordingly, soft proofing that reduces the need to actually print the image can be performed and efficiency of work can be improved. Specifically, the CPU 1 reads out information on a printer and paper that are usable by the image processing apparatus 302 which is stored in the storage unit 4 and presents the information to the user by GUI display or the like. The user performs an operation for specifying a printer and paper to be used from the presented information via the user operation input unit 6. Accordingly, the CPU 1 acquires information on the printer and paper specified by the user.

In step S1202, the CPU 1 acquires information on an observation light source specified by the user to be used to observe printed matter. The observation light source is the observation light source 305 installed in the printed matter observation booth 304. In a similar manner to the specification method of step S1201, the user performs an operation for inputting information on the observation light source, whereby the information is input to the image processing apparatus 302 via the user operation input unit 6. The information specified at this point is, specifically, information including a type of a fluorescent lamp that is used as the light source.

In step S1203, the CPU 1 determines whether or not a visual distance sensor is installed in the observation environment. In other words, the CPU 1 determines whether or not a visual distance sensor is installed in the printed matter observation booth 304. Information on whether or not a visual distance sensor is installed in the observation environment can be acquired by having the user input the information in a similar manner to steps S1201 and S1202. Alternatively, the information may be acquired by determining whether or not a visual distance sensor for an observation environment is connected to the external interface unit 7. When a visual distance sensor is installed in the observation environment, in step S1204, the CPU 1 acquires information on a visual distance between the user and the printed matter from the visual distance sensor. When a visual distance sensor is not installed, in step S1205, the CPU 1 acquires information on the visual distance between the user and the printed matter by having the user input information on the visual distance. The visual distance information input by the user is acquired via the user operation input unit 6 in a similar manner to step S1201.

Figure 13:
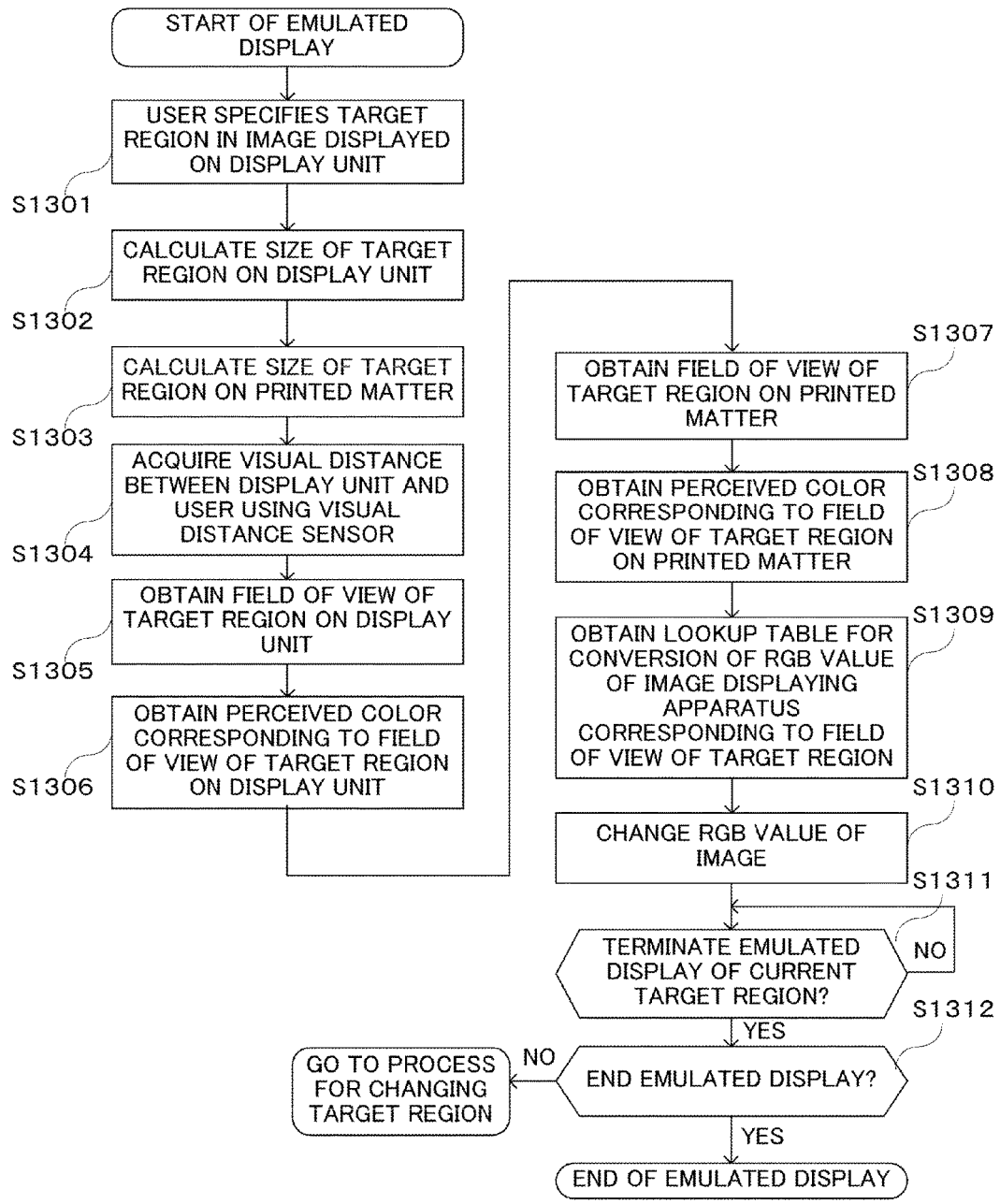
FIG. 13 is a flow chart of a process for performing an emulated display according to the first embodiment.

FIG. 13 is a diagram showing a flow of an emulated display process for matching a color of a display to a color of printed matter in step S1105 shown in FIG. 11.

In step S1301, the CPU 1 acquires information on a target region of an image displayed on the display unit 3 as specified by the user. The specification of a target region by the user is performed using a pointing device such as a mouse, and information on the specified target region is input to the image processing apparatus 302 via the user operation input unit 6. A specific specification method is as described with reference to FIG. 4.

In step S1302, based on the target region information specified in step S1301, the CPU 1 obtains a size of a target region to be displayed on the display. As described with reference to FIG. 5, the CPU 1 acquires a length r of a long side of the specified target region as the size of the target region. The CPU 1 obtains the size of the target region on the display using the target region identifying unit 101. The size of the target region on the display is obtained based on size information of the image displayed on the display unit 3 obtained by the image viewer 107 and on the target region information specified by the user.

In step S1303, based on the target region information specified in step S1301, the CPU 1 obtains a size of a target region on printed matter. As the size of the target region, the CPU 1 acquires a length on the printed matter of a same side as the long side of the target region acquired in step S1302 as the size of the target region on the display. The CPU 1 acquires information on a size of the printed matter using the image viewer 107 and, based on the size of the printed matter, acquires information on the target region on the printed matter using the target region identifying unit 101 and obtains a size of the target region on the printed matter. Moreover, when the size of the printed matter and the size of the image displayed on the display unit 3 are equal to each other, the sizes of the regions of interest have a same value on the printed matter and on the display.

In step S1304, the CPU 1 performs a process for obtaining a visual distance between the display unit 3 and the user. In the first embodiment, the CPU 1 acquires a measurement value of the visual distance from the visual distance sensor 8 installed in the display using the visual distance acquiring unit 105. The measurement value of the visual distance acquired from the visual distance sensor 8 is input to the image processing apparatus 302 via the external interface unit 7.

In step S1305, the CPU 1 calculates a field of view of the target region displayed on the display unit 3. Using the field of view calculating unit 102, the CPU 1 calculates the field of view of the target region on the display based on the size of the target region on the display obtained in step S1302 and the visual distance between the display unit 3 and the user obtained in step S1304. A specific calculation method is as described with reference to FIG. 5.

In step S1306, the CPU 1 calculates a perceived color of the target region on the display. The CPU 1 reads out a color matching function corresponding to the field of view obtained in step S1305 from the storage unit 4 using the color matching function selecting unit 103. The storage unit 4 stores color matching functions corresponding to respective fields of view as a database. The color matching function selecting unit 103 acquires a color matching function corresponding to a field of view that is closest to the field of view calculated in step S1305 from the database. Alternatively, a color matching function corresponding to the field of view calculated in step S1305 may be obtained by an interpolation calculation from color matching functions of fields of view that are close to the field of view calculated in step S1305.

Next, the perceived color calculating unit 106 calculates a perceived color of the target region on the display based on the color matching function read out from the storage unit 4. As described with reference to FIG. 9, the perceived color calculating unit 106 calculates a perceived color from an XYZ value using a color matching function and spectral characteristics. The storage unit 4 stores, in advance, spectral characteristics when an image with a given RGB value is displayed on the display as a database for a plurality of types of RGB values. The perceived color calculating unit 106 performs the calculation using spectral characteristics acquired from the storage unit 4. The perceived color calculating unit 106 temporarily stores the calculated perceived color in the memory 5. The perceived color calculating unit 106 stores the calculated perceived color in the memory 5 in a format of the table 702 shown in FIG. 7.

In step S1307, the CPU 1 obtains a field of view of the target region on the printed matter. The CPU 1 calculates the field of view using the field of view calculating unit 102. The field of view calculating unit 102 calculates the field of view of the target region on the printed matter based on the size of the target region on the printed matter acquired in step S1303 and the visual distance between the user and the printed matter when observing the printed matter. The field of view calculating unit 102 acquires the visual distance between the user and the printed matter based on set information (information acquired in step S1204 or S1205 in FIG. 12) on the printed matter observation environment described with reference to FIG. 12.

In step S1308, the CPU 1 obtains a perceived color of the target region on the printed matter. The CPU 1 reads out a color matching function corresponding to the field of view acquired in step S1307 from the storage unit 4 using the perceived color calculating unit 106. The perceived color calculating unit 106 obtains the perceived color of the target region on the printed matter by integrating a product of the color matching function read out from the storage unit 4 and the spectral characteristics of the printed matter acquired by the spectral characteristics calculating unit 104. The perceived color calculating unit 106 temporarily stores the calculated perceived color in the memory 5. The perceived color calculating unit 106 stores the calculated perceived color in the memory 5 in a format of the table 701 shown in FIG. 7.

In step S1309, the CPU 1 uses the color conversion table creating unit 108 to calculate a conversion lookup table to be used to convert image data to be displayed on the display in order to reproduce and display the color of the target region on the printed matter in the target region on the display. A method of calculating the lookup table is as described with reference to FIG. 7. The color conversion table creating unit 108 performs a process for calculating a lookup table based on the perceived color of the target region on the display obtained in step S1306 and the perceived color of the target region on the printed matter obtained in step S1308.

In step S1310, the CPU 1 uses the color conversion processing unit 109 to convert an RGB value of image data to be displayed on the display unit 3 using the lookup table created in step S1309. As a result of the processes described above, the image data is converted so that a visual color of the target region on the display matches a visual color of the target region on the printed matter.

In step S1311, the CPU 1 performs a determination process on whether or not to terminate the emulated display of the current target region. There are cases where a plurality of regions of interest to the user is present in an image. In such a case, the user may conceivably change the observation object to a target region that differs from the current target region. In addition, there are cases where the user instructs an enlargement process or the like of a target region. In such a case, color conversion of image data for emulated display must be performed once again in accordance with a size (field of view) of the other target region or the enlarged/reduced target region. In order to determine whether or not re-conversion of image data is necessary, in step S1311, the CPU 1 determines whether or not a stage of the target region has changed. When the state has not changed, the CPU 1 continues the emulated display of the current target region. When it is determined that a change has occurred, the CPU 1 advances to step S1312. The determination of the present step is performed based on information on a user operation. When the user performs an operation for inputting an instruction to terminate observation of the current target region and change the observation object to another target region or performs an operation for inputting an instruction for a display change involving enlarging or reducing the current target region, the CPU 1 acquires information on the operation via the user operation input unit 6. The CPU 1 makes the determination based on the acquired information.

In step S1312, the CPU 1 determines whether or not to terminate the emulated display. When terminating the emulated display, the CPU 1 cancels the color conversion process executed in step S1310 for matching colors of regions of interest between the display and the printed matter, restores an original state, and terminates the emulated display. When the emulated display is not terminated, the CPU 1 makes a transition to a process for changing a target region which will be described below.

Next, a process performed when the user changes the target region while an image is being displayed will be described with reference to FIG. 14. The process is executed when it is determined that the emulated display is not to be terminated in step S1312 in FIG. 13.

In step S1401, the CPU 1 monitors an input of an instruction to change a target region by the user and stands by for an input of a user operation. In this case, examples of an instruction to change a target region include an instruction to specify a target region that differs from the current target region and an instruction to enlarge/reduce the image being displayed. In a case where another target region is specified, a size of the target region may differ from the size of the current target region. In addition, even if another target region is not specified (even when the current target region remains unchanged), the size of the target region changes when the image is displayed enlarged/reduced. In such a case, an emulation process must be changed in accordance with a field of view of the target region. A flow of changing emulation processes in accordance with a change in fields of view will be described below. When a user operation is detected, the CPU 1 advances to step S1402.

In step S1402, the CPU 1 determines whether or not the user instruction is an instruction to change the target region. When the instruction is for changing the target region, the CPU 1 advances to step S1404, and when the instruction is not for changing the target region, the CPU 1 advances to step S1403.

In step S1403, the CPU 1 determines whether or not the user instruction is an instruction for an enlargement/reduction process of the image. When the instruction is an enlargement/reduction process of the image, the CPU 1 advances to step S1405. When the instruction is not an enlargement/reduction process of the image, since there is no need to change the emulation process, the CPU 1 returns to the state of standing by for a user input of step S1401.

In step S1404, the CPU 1 determines whether or not a field of view of another target region specified by the user has changed from the field of view of the current target region. Even when regions of interest are changed, if the field of view of the regions of interest remains unchanged, the emulation process need not be changed since a correspondence relationship between the perceived color of the target region on the display and the perceived color of the target region on the printed matter stays the same. In this case, the CPU 1 returns to the state of standing by for a user input of step S1401. When the field of view of the target region has changed, since a color conversion process in emulated display must be changed, the CPU 1 advances to step S1405.

In step S1405, with respect to the new target region, the CPU 1 re-calculates a size of the target region on the display. The process of step S1405 is the same as the process of step S1302 shown in FIG. 13.

In step S1406, with respect to the new target region, the CPU 1 re-calculates a size of the target region on the printed matter. The process of step S1406 is the same as the process of step S1303 shown in FIG. 13.

In step S1407, with respect to the new target region, the CPU 1 calculates a field of view of the target region on the display. The CPU 1 calculates the field of view based on the size of the target region obtained in step S1405 and the visual distance between the display unit 3 and the user. Assuming that the visual distance has not changed, the visual distance acquired in step S1304 is not updated. The process of step S1407 is the same as the process of step S1305 shown in FIG. 13. Moreover, the visual distance may conceivably change due to a movement of the user with respect to the display. Therefore, before obtaining a field of view in step S1407, a visual distance may be re-acquired by a process similar to that of step S1304 and the field of view may be obtained using the latest visual distance information.

In step S1408, with respect to the new target region, the CPU 1 calculates a perceived color of the target region on the display based on the field of view obtained in step S1407. The process of step S1408 is the same as the process of step S1306 shown in FIG. 13.

In step S1409, with respect to the new target region, the CPU 1 obtains a field of view of the target region on the printed matter. The CPU 1 calculates the field of view based on the size of the target region obtained in step S1406 and the visual distance between the printed matter and the user. Assuming that the visual distance has not changed, the visual distance acquired in FIG. 12 is not updated. Moreover, the visual distance may conceivably change due to a movement of the user with respect to the printed matter in the printed matter observation booth 304. Therefore, before obtaining a field of view in step S1409, a visual distance may be re-acquired by a process similar to that of FIG. 12 and the field of view may be obtained using the latest visual distance information. The process of step S1409 is the same as the process of step S1307 shown in FIG. 13.

In step S1410, with respect to the new target region, the CPU 1 obtains a perceived color of the target region on the printed matter based on the field of view obtained in step S1409. The process of step S1410 is the same as the process of step S1308 shown in FIG. 13.

In step S1411, the CPU 1 calculates a conversion lookup table to be used to convert image data to be displayed on the display in order to reproduce and display the color of the new target region on the printed matter in the new target region on the display. The CPU 1 calculates the conversion lookup table using the color conversion table creating unit 108 based on the perceived colors obtained in steps S1408 and S1410. The process of step S1411 is the same as the process of step S1309 shown in FIG. 13.

In step S1412, the CPU 1 uses the lookup table created in step S1411 to convert an RGB value of image data to be displayed on the display. The process of step S1412 is the same as the process of step S1310 shown in FIG. 13.

Figure 14:
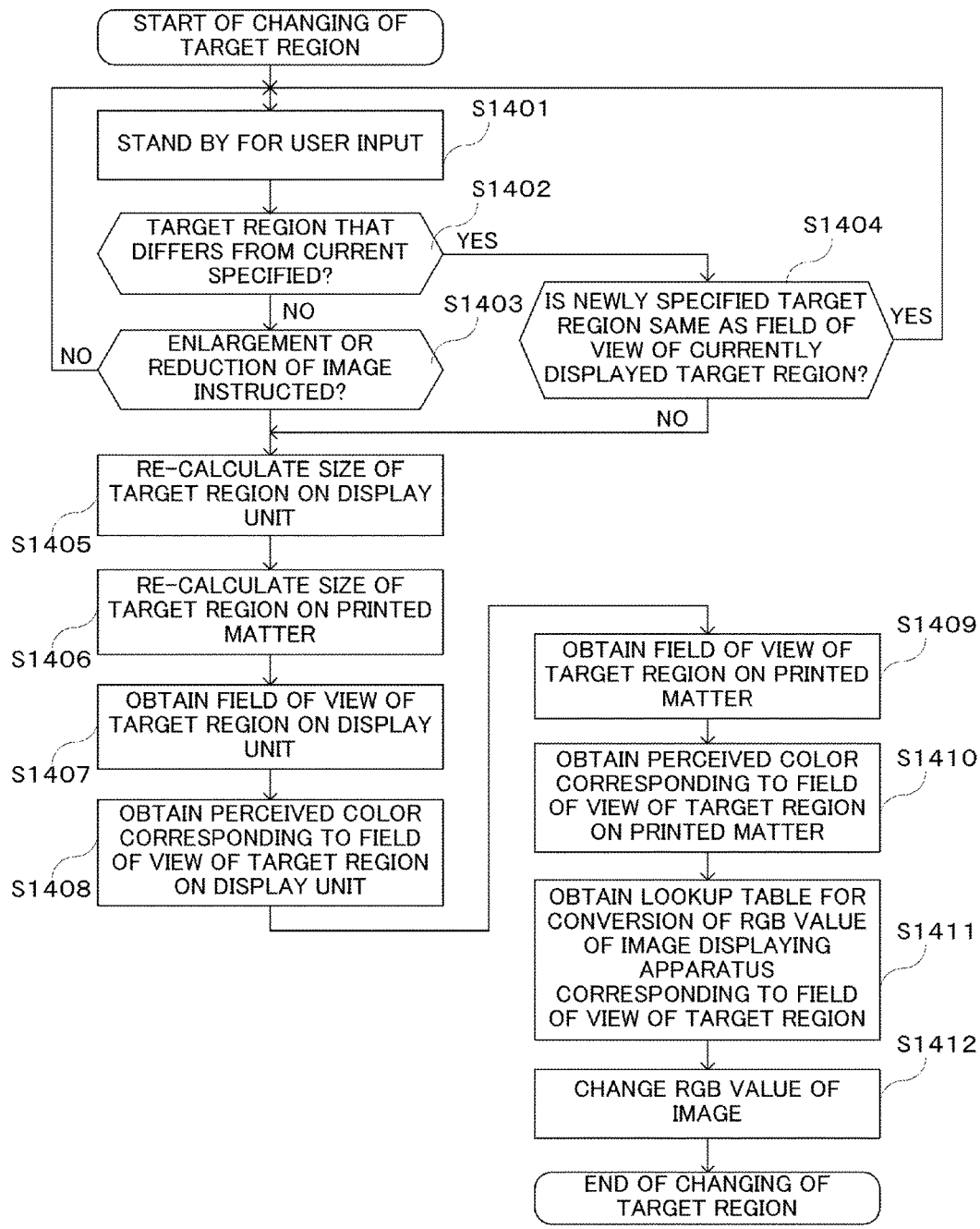
FIG. 14 is a flow chart of a process for changing a target region when performing an emulated display according to the first embodiment.

While emulation processes are changed in accordance with a change in regions of interest, due to the processes shown in FIG. 14, emulated display can be performed with precision even when regions of interest change.

According to the first embodiment described above, a target region on the display specified by the user can be displayed in a same color as a target region on printed matter. Therefore, even when fields of view change due to a change in a size of the target region or the like, a perceived color on the display and a perceived color on the printed matter can be matched with each other. As a result, high precision printing emulation using a display can be performed.

(Second Embodiment)

The second embodiment of the present invention will be described.

In the second embodiment, an observation environment of printed matter is determined by assuming an observation environment of a final article. Performing an accurate emulated display with respect to the final article enables an emulated display to be performed with higher precision using a display.

Hereinafter, a process for determining an observation environment of a final article according to the second embodiment of the present invention will be described with reference to the drawings. Moreover, since the second embodiment is similar to the first embodiment with the exception of a method of determining an observation environment of printed matter, a description of such similarities will be omitted.

Figure 15:
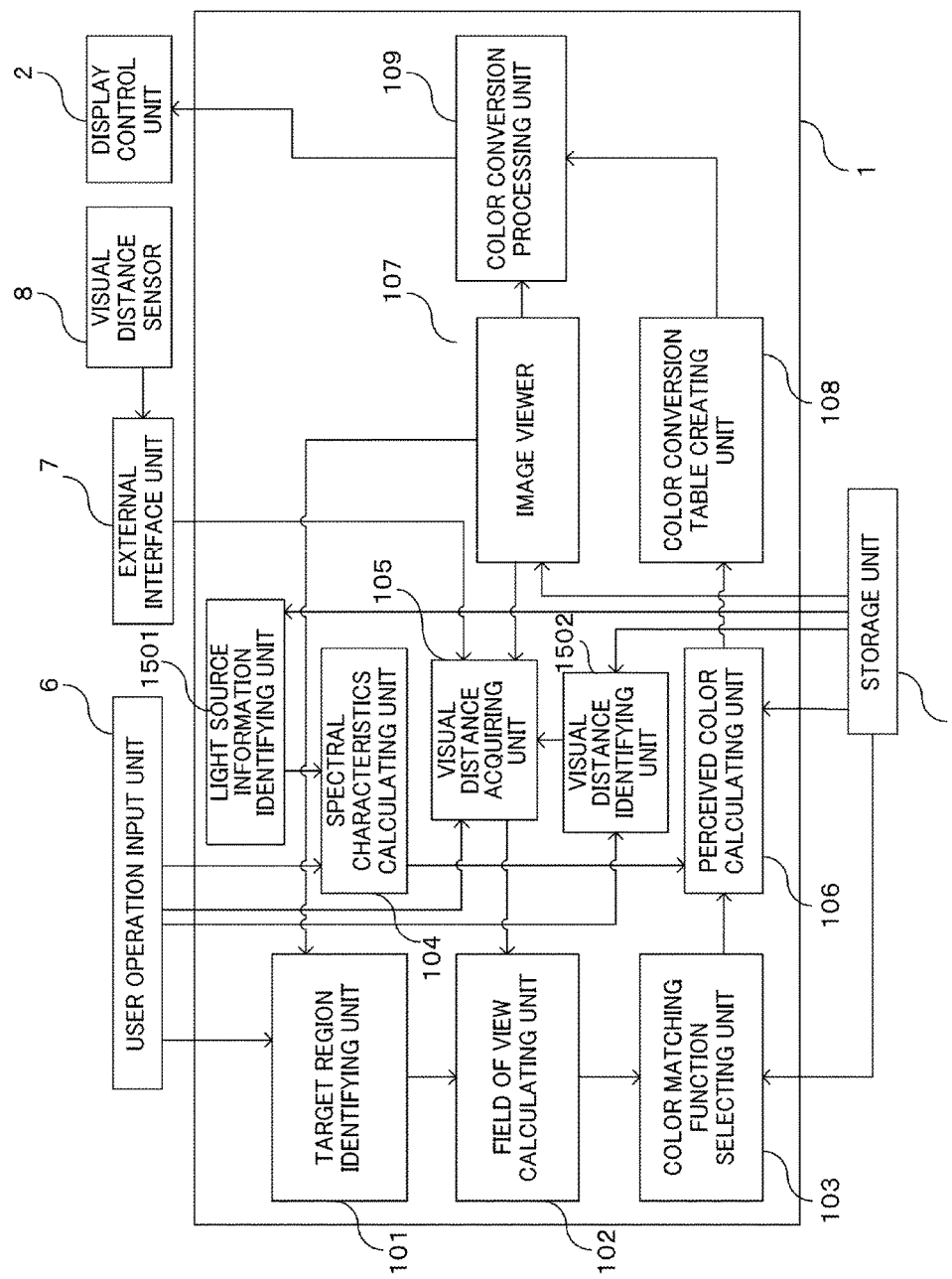
FIG. 15 is a diagram showing functional blocks of an image displaying apparatus according to a second embodiment.

FIG. 15 shows a functional block diagram of an image processing apparatus according to the second embodiment. Note that a description of functional blocks that are similar to those of the first embodiment will be omitted.

A light source information identifying unit 1501 obtains information on a light source used when observing a final article based on the observation environment information of the final article specified by the user. The spectral characteristics calculating unit 104 calculates spectral characteristics of the article based on the light source information identified by the light source information identifying unit 1501.

A visual distance identifying unit 1502 obtains information on a visual distance that applies when observing the final article based on information on a genre of the final article specified by the user. Examples of a genre of the final article include magazines, books, and posters. Information on a correspondence relationship between each genre and a visual distance in a general observation mode of printed matter belonging to the genre are stored in the storage unit 4 in advance. The visual distance identifying unit 1502 acquires information on a visual distance in accordance with a genre based on genre information and correspondence relationship information stored in the storage unit 4.

Figure 16:
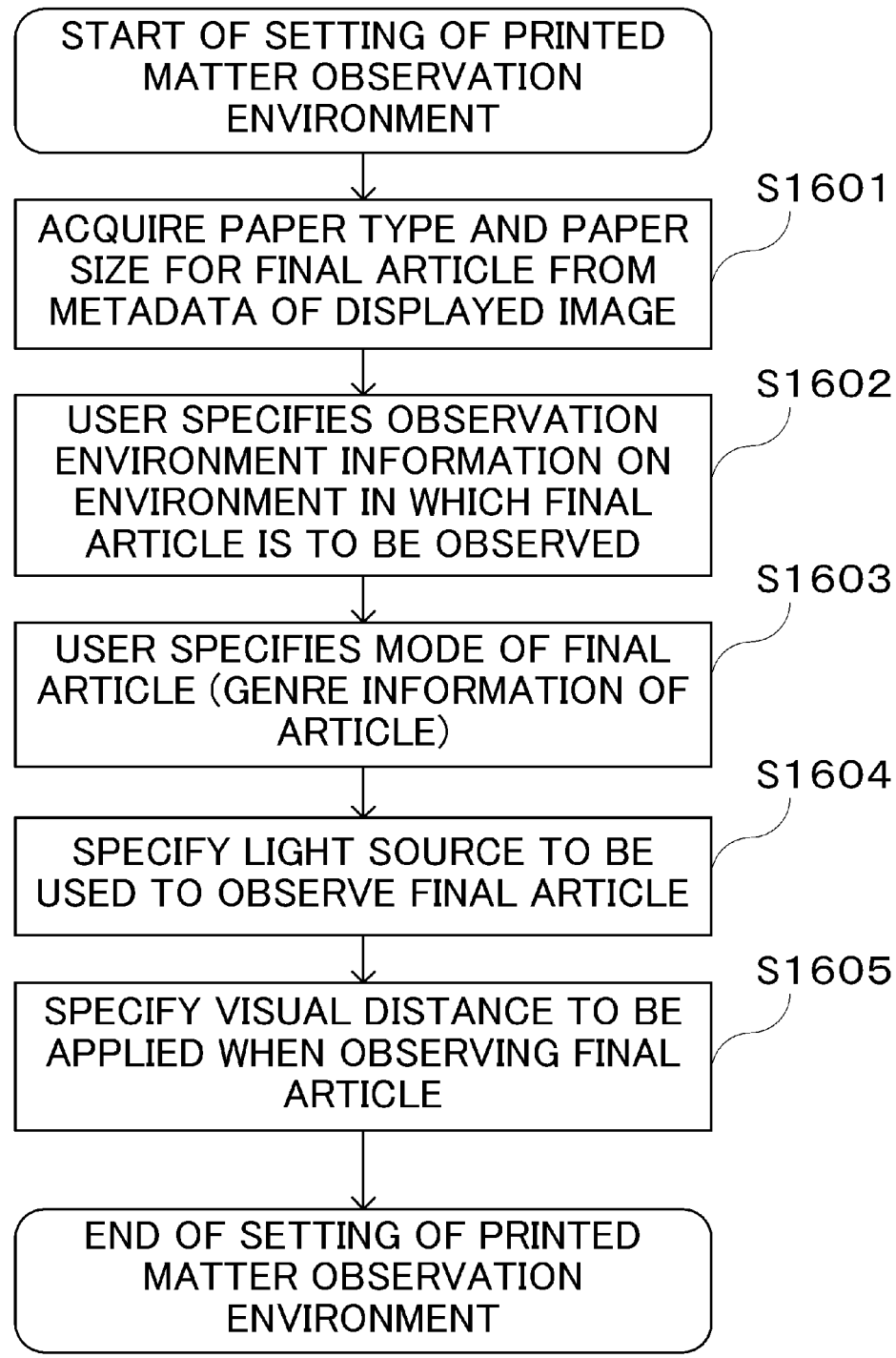
FIG. 16 is a flow chart of a process for setting an observation environment of printed matter according to the second embodiment.

FIG. 16 shows a process flow for setting an observation environment of a final article according to the second embodiment.

In step S1601, the CPU 1 reads out metadata regarding the final article from image data. The information that is read out at this point includes a size and spectral characteristics of paper that is used for the final article. The present process is executed by the image viewer 107.

In step S1602, the CPU 1 acquires information on an observation environment in which the final article is to be observed as specified by the user. The observation environment information specified by the user is input to the image processing apparatus 302 from the user operation input unit 6. In this case, as the observation environment information, the CPU 1 acquires information on a location where the final article is to be observed. Information on a location refers to information describing a location where the final article is expected to be observed such as outdoors, indoors, an office, and a living room. Based on the location information acquired in step S1602, the CPU 1 performs a process for identifying a light source in step S1604 (to be described later).

In step S1603, the CPU 1 acquires genre information of the final article as specified by the user. The genre information specified by the user is input to the image processing apparatus 302 from the user operation input unit 6. Based on the genre information, in what kind of environment the user intends to observe the article is identified.

In step S1604, the CPU 1 uses the light source information identifying unit 1501 to identify information on a light source in an environment where the article is to be observed based on the observation environment information acquired in step S1602. Information on a correspondence relationship between an observation environment and a light source is stored in the storage unit 4 in, for example, a table format. The light source information identifying unit 1501 reads out information on the correspondence relationship between the observation environment and the light source from the storage unit 4 and, based on the information on the correspondence relationship, identifies information on the light source corresponding to the observation environment acquired in step S1602. For example, when the observation environment is outdoors, sunlight is identified as the light source, and when the observation environment is an office, a fluorescent lamp is identified as the light source. Information on the correspondence relationship between an observation environment and a light source may include information on spectral characteristics of the light source.

In step S1605, the CPU 1 uses the visual distance identifying unit 1502 to identify a visual distance to be applied when observing the article based on the genre information of the article specified in step S1603. Information on a correspondence relationship between a genre of an article and a visual distance is stored in the storage unit 4 in, for example, a table format. The visual distance identifying unit 1502 reads out information on the correspondence relationship between the genre of the article and the visual distance from the storage unit 4 and, based on the information on the correspondence relationship, identifies a visual distance corresponding to the genre of the article acquired in step S1603. For example, when the genre is a magazine or a book, 20 cm is identified as the visual distance, and when the genre is a poster or the like, 1 m is identified as the visual distance.

According to the second embodiment described above, since an emulated display of a printing result can be performed on a display in accordance with an observation environment of a final article, a color of the final article can be reproduced on the display with high precision.

(Third Embodiment)

The third embodiment of the present invention will be described. The third embodiment differs from the first embodiment in a method of specifying a target region in an image displayed on a display. In the third embodiment, a plurality of regions extracted in advance as candidates of a target region are presented to the user, whereby the user is asked to select a target region from the candidates. Since the third embodiment other than the method of specifying a target region by the user is similar to the first embodiment, a description on such similarities will be omitted.

Figure 17:
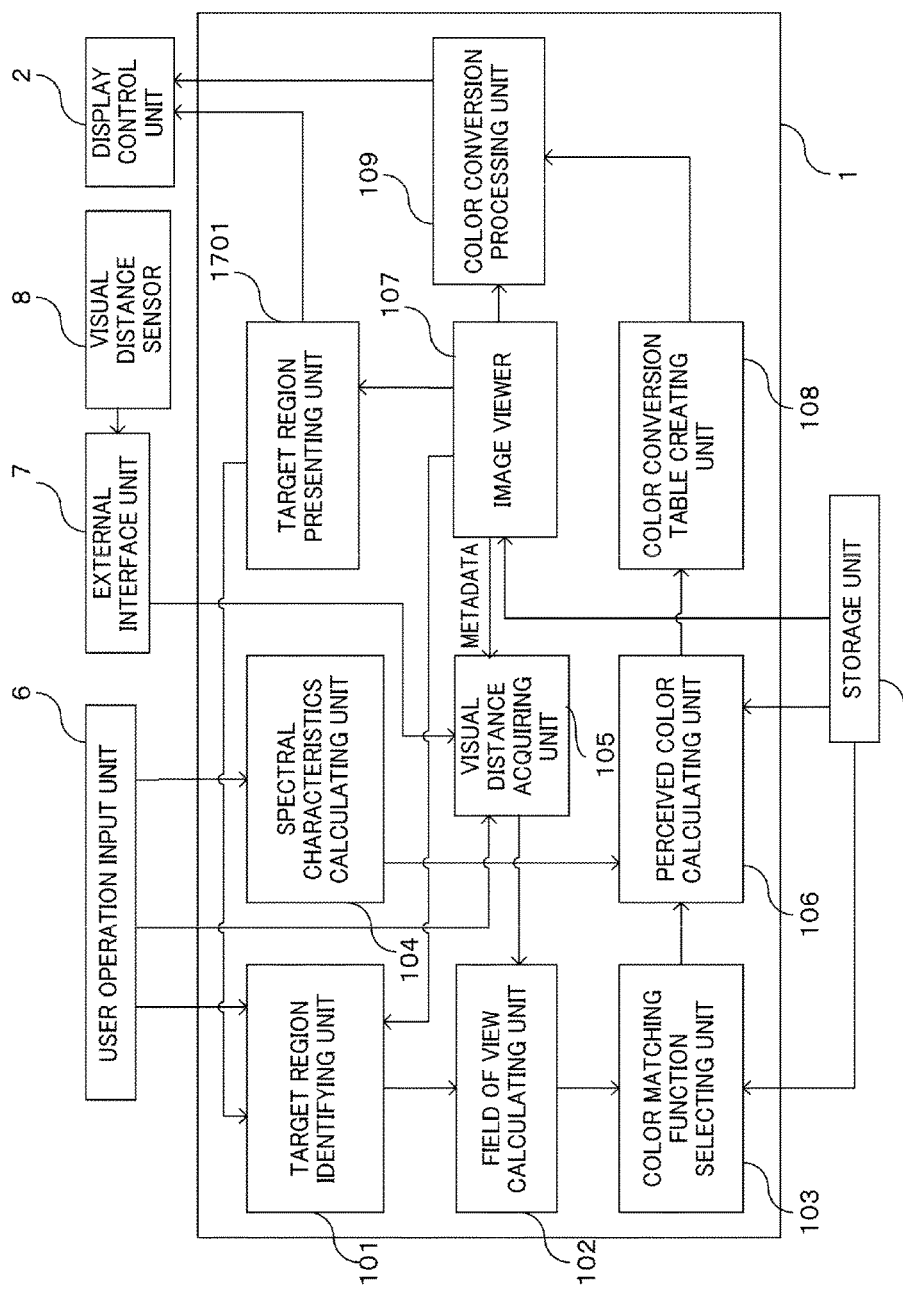
FIG. 17 is a diagram showing functional blocks of an image displaying apparatus according to a third embodiment.

FIG. 17 shows a functional block diagram of an image processing apparatus according to the third embodiment. Note that a description of functional blocks that are similar to those of the first embodiment will be omitted.

A target region presenting unit 1701 acquires information on candidates of a target region in an image from the image viewer 107 and performs a list display to have the user select a target region from the candidates. The target region presenting unit 1701 executes the list display by issuing an instruction for list display to the display control unit 2.

Figure 18:
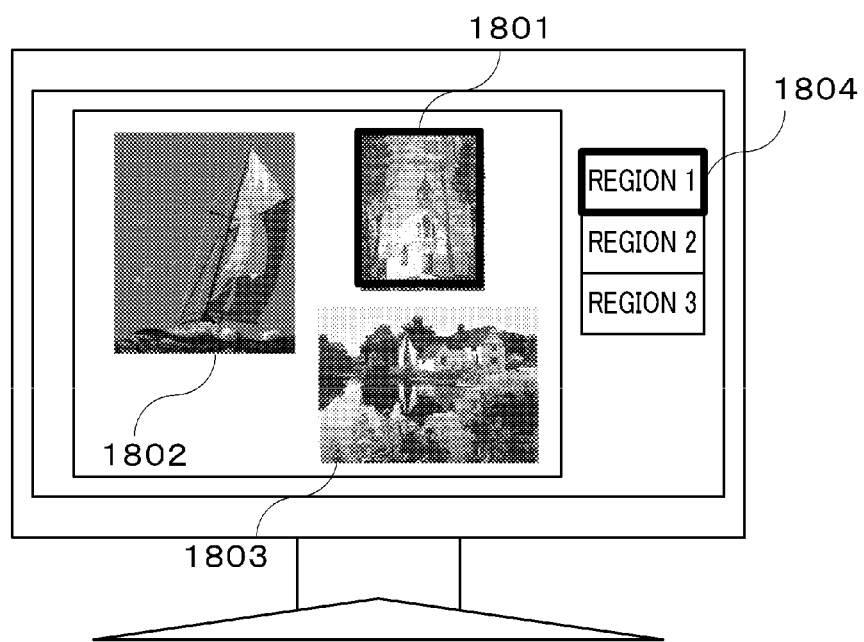
FIG. 18 is a diagram showing a presentation example of a screen when a user specifies a target region according to the third embodiment.

FIG. 18 shows an example of a list display of candidates of a target region. FIG. 18 is a diagram explaining a process in which, with respect to an image including a plurality of candidate regions that are candidates of a target region, candidate regions that can be set as a target region are presented to the user and a candidate region selected by the user is set as the target region. The example in FIG. 18 shows that candidate regions 1801, 1802, and 1803 that can be set as a target region are provided in an image, and a list 1804 for selecting a candidate region is displayed. The user selects any of the candidate regions from the list as the target region. FIG. 18 shows a region 1 being selected. The target region identifying unit 101 acquires information on the candidate region selected by the user from the presented candidate regions from the target region presenting unit 1701 and sets the candidate region as a target region. Other processes are similar to those of the first embodiment.

As described above, according to the third embodiment, since a region selected by the user from candidate regions set in advance can be set as a target region in an image, the target region can be specified by a simple operation. As a result, user convenience is improved.

While an example in which the image processing apparatus 302 and the display 301 are provided as separate components has been described in the respective embodiments above, the present invention can also be implemented with a configuration in which the display 301 is equipped with the functions of the image processing apparatus 302. In addition, both a configuration in which a sensor that measures a visual distance between the display 301 and the user is provided in the display 301 and a configuration which uses a sensor that is independent of the display 301 may be adopted. In a configuration where the user is asked to input a visual distance, the visual distance sensor 8 need not necessarily be provided. The present invention may be implemented as a function expansion board that adds the respective functions of the image processing apparatus 302 shown in FIG. 1 to a generic computer. Alternatively, the present invention may be implemented as a program, software, or an application which realizes the respective functions of the image processing apparatus 302 shown in FIG. 1 when being executed by a generic computer, and as a recording medium that stores the program, the software, or the application.

In the respective embodiments described above, a field of view of a target region on a display and a field of view of a target region on printed matter are obtained. Respective relationships between a pixel value and a perceived color on the display and on the printed matter are obtained (tables 701 and 702 in FIG. 7) based on color matching functions corresponding to the respective fields of view, spectral characteristics of the display, and spectral characteristics of an observation environment of the printed matter. Based on the relationship, a relationship between pixel values to be respectively input to a display and a printer (a relationship between image data to be displayed on the display and image data to be printed by the printer) is obtained so that a same perceived color is presented on the display and the printer (table 703 in FIG. 7). In this manner, an example in which the tables in FIG. 7 are calculated every time a field of view of a target region is identified has been described in the respective embodiments above. Alternatively, the tables shown in FIG. 7 may be created in advance and stored in the storage unit 4 based on various fields of view, spectral characteristics of various displays, and spectral characteristics of reflected light from printed matter when using various light sources and various types of paper. When actually performing an emulated display, an appropriate table may be readout from the storage unit 4 in accordance with information on a field of view of a target region, information on a display, and information on a light source and a type of paper in an observation environment of printed matter, and color conversion may be performed using the read table.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to readout and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068904, filed on Mar. 28, 2014, which is hereby incorporated by reference herein in its entirety.

What is claimed is:

1. An image processing apparatus capable of matching a perceived color of printed matter and a perceived color on a display to display the perceived color of printed matter on the display, the image processing apparatus comprising:
   at least one processor that functions as:
   an acquiring unit configured to:
      acquire a first field of view that is a field of view of a user with respect to a first region in an image based on image data, on the display that displays the image,
      acquire a second field of view of the user with respect to a second region that corresponds to the first region on printed matter on which the image based on the image data is printed,
      acquire information regarding spectral characteristics of the display, and
      acquire information regarding spectral characteristics of reflected light from the printed matter;
   a converting unit configured to convert image data to be displayed on the display based on the first field of view, the information regarding spectral characteristics of the display, the second field of view, and the information regarding spectral characteristics of reflected light from the printed matter so that a color perceived by the user in the first field of view on the display becomes a color that corresponds to a color perceived by the user in the second field of view on the printed matter; and
   a display control unit configured to control the display to display the image data converted by the converting unit.

2. The image processing apparatus according to claim 1, wherein
   the acquiring unit further configured to acquire a color matching function corresponding to the first field of view and a color matching function corresponding to the second field of view, and
   the converting unit converts the image data based on the color matching function corresponding to the first field of view, the color matching function corresponding to the second field of view, the information regarding spectral characteristics of the display, and the information regarding spectral characteristics of reflected light from the printed matter.

3. The image processing apparatus according to claim 2, wherein the at least one processor further functions as a calculating unit configured to
   calculate a color of the display as perceived by the user in the first field of view based on the color matching function corresponding to the first field of view and the spectral characteristics of the display, and
   calculate a color of the printed matter as perceived by the user in the second field of view based on the color matching function corresponding to the second field of view and the spectral characteristics of reflected light from the printed matter, wherein
   the converting unit converts the image data based on the color of the display and the color of the printed matter calculated by the calculating unit.

4. The image processing apparatus according to claim 3, wherein the converting unit calculates, based on the color of the display and the color of the printed matter calculated by the calculating unit, a correspondence relationship between a first pixel value of image data to be printed and a second pixel value of image data to be displayed on the display in order to enable a color perceived by the user in the second field of view on printed matter obtained by printing the image data with the first pixel value to be perceived by the user in the first field of view on the display, and the converting unit converts the image data based on the correspondence relationship.

5. The image processing apparatus according to claim 1, wherein the converting unit acquires, from a storage unit, information on a correspondence relationship between a first pixel value of image data to be printed and a second pixel value of image data to be displayed on the display in order to enable a color perceived by the user in the first field of view on printed matter obtained by printing the image data with the first pixel value to be perceived by the user in the second field of view on the display, the correspondence relationship being obtained in advance based on the first field of view, the information regarding spectral characteristics of the display, the second field of view, and the information regarding spectral characteristics of reflected light from the printed matter, and the converting unit converts the image data based on the correspondence relationship.

6. The image processing apparatus according to claim 1, wherein the acquiring unit acquires information on a light source that illuminates the printed matter, information on paper to be used for the printed matter, and information on a printer to print an image based on the image data, as the information regarding spectral characteristics of reflected light from the printed matter.

7. The image processing apparatus according to claim 6, wherein the acquiring unit
- acquires, from a storage unit, information on a correspondence relationship between a type of the printed matter and a light source that is expected to be used as a light source of an observation environment of the printed matter,
- acquires information on the type of the printed matter, and
- acquires the information on the light source to illuminate the printed matter from the information on the type of the printed matter and information on the correspondence relationship.

8. The image processing apparatus according to claim 1, wherein the acquiring unit accepts an input for specifying a first region in the image from the user and acquires the first field of view based on information on the first region specified by the user.

9. The image processing apparatus according to claim 8, wherein the acquiring unit
- presents a plurality of regions in the image to the user as candidates of the first region,
- accepts an input by the user for selecting any of the regions among the plurality of candidates as the first region, and
- acquires the first field of view based on the first region selected by the user.

10. The image processing apparatus according to claim 8, wherein
- when the first region specified by the user is changed to a different region in the image,
- the acquiring unit acquires a first field of view of the user with respect to the changed first region on the display and a second field of view of the user with respect to a second region on the printed matter that corresponds to the changed first region, and
- the converting unit converts the image data based on the first field of view of the user with respect to the changed first region on the display, the second field of view of the user with respect to the second region on the printed matter that corresponds to the changed first region, the information regarding spectral characteristics of the display, and the information regarding spectral characteristics of reflected light from the printed matter.

11. The image processing apparatus according to claim 1, wherein the acquiring unit acquires information on a visual distance between the display and the user, and information on a size of the first region displayed on the display, and calculates the first field of view based on the visual distance and the size of the first region.

12. The image processing apparatus according to claim 11, wherein the acquiring unit acquires the information on the visual distance from a first sensor that measures the visual distance between the display and the user.

13. The image processing apparatus according to claim 11, wherein the acquiring unit accepts an input of the information on the visual distance by the user and acquires the information on the visual distance from the input by the user.

14. The image processing apparatus according to claim 11, wherein the acquiring unit calculates a size of the first region based on image data of the first region and a size and resolution of the display.

15. The image processing apparatus according to claim 1, wherein the acquiring unit acquires information on a visual distance between the printed matter and the user, and information on a size of the second region printed on the printed matter, and calculates the second field of view based on the visual distance and the size of the second region.

16. The image processing apparatus according to claim 15, wherein the acquiring unit acquires the information on the visual distance from a second sensor that measures the visual distance between the printed matter and the user.

17. The image processing apparatus according to claim 15, wherein the acquiring unit accepts an input of the information on the visual distance by the user and acquires the information on the visual distance from the input by the user.

18. The image processing apparatus according to claim 15, wherein the acquiring unit acquires, from a storage unit, information on a correspondence relationship between a type of the printed matter and a visual distance that is expected to be applied as the visual distance between the printed matter and the user, acquires information on the type of the printed matter, and acquires the information on the visual distance from the information on the type of the printed matter and information on the correspondence relationship.

19. The image processing apparatus according to claim 15, wherein the acquiring unit calculates a size of the second region based on image data of the second region and a size of paper on which the printed matter is to be printed.

20. A control method of an image processing apparatus capable of matching a perceived color of printed matter and a perceived color on a display to display the perceived color of printed matter on the display, the control method comprising the steps of:
- acquiring a first field of view that is a field of view of a user with respect to a first region in an image based on image data, on the display that displays the image;
- acquiring a second field of view of the user with respect to a second region that corresponds to the first region on printed matter on which the image based on the image data is printed;
- acquiring information regarding spectral characteristics of the display;
- acquiring information regarding spectral characteristics of reflected light from the printed matter;
- converting image data to be displayed on the display based on the first field of view, the information regarding spectral characteristics of the display, the second field of view, and the information regarding spectral characteristics of reflected light from the printed matter so that a color perceived by the user in the first field of view on the display becomes a color that corresponds to a color perceived by the user in the second field of view on the printed matter; and
- controlling the display to display the image data converted in the converting step.

* * * * *